Figure 1:
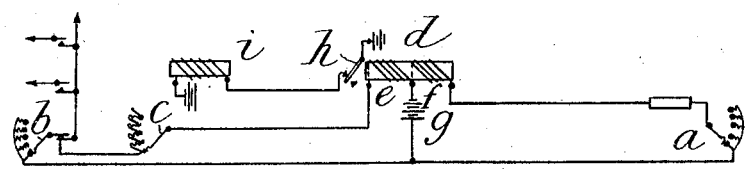

Oct. 30, 1923.

T. LENAGHAN 1,472,604

AUTOMATIC TELEPHONE SYSTEM

Filed April 28, 1920  19 Sheets-Sheet 1

INVENTOR
Thomas Lenaghan
BY
Townsend Decker
ATTORNEYS

Oct. 30, 1923.
T. LENAGHAN
1,472,604
AUTOMATIC TELEPHONE SYSTEM
Filed April 28, 1920
19 Sheets-Sheet 2
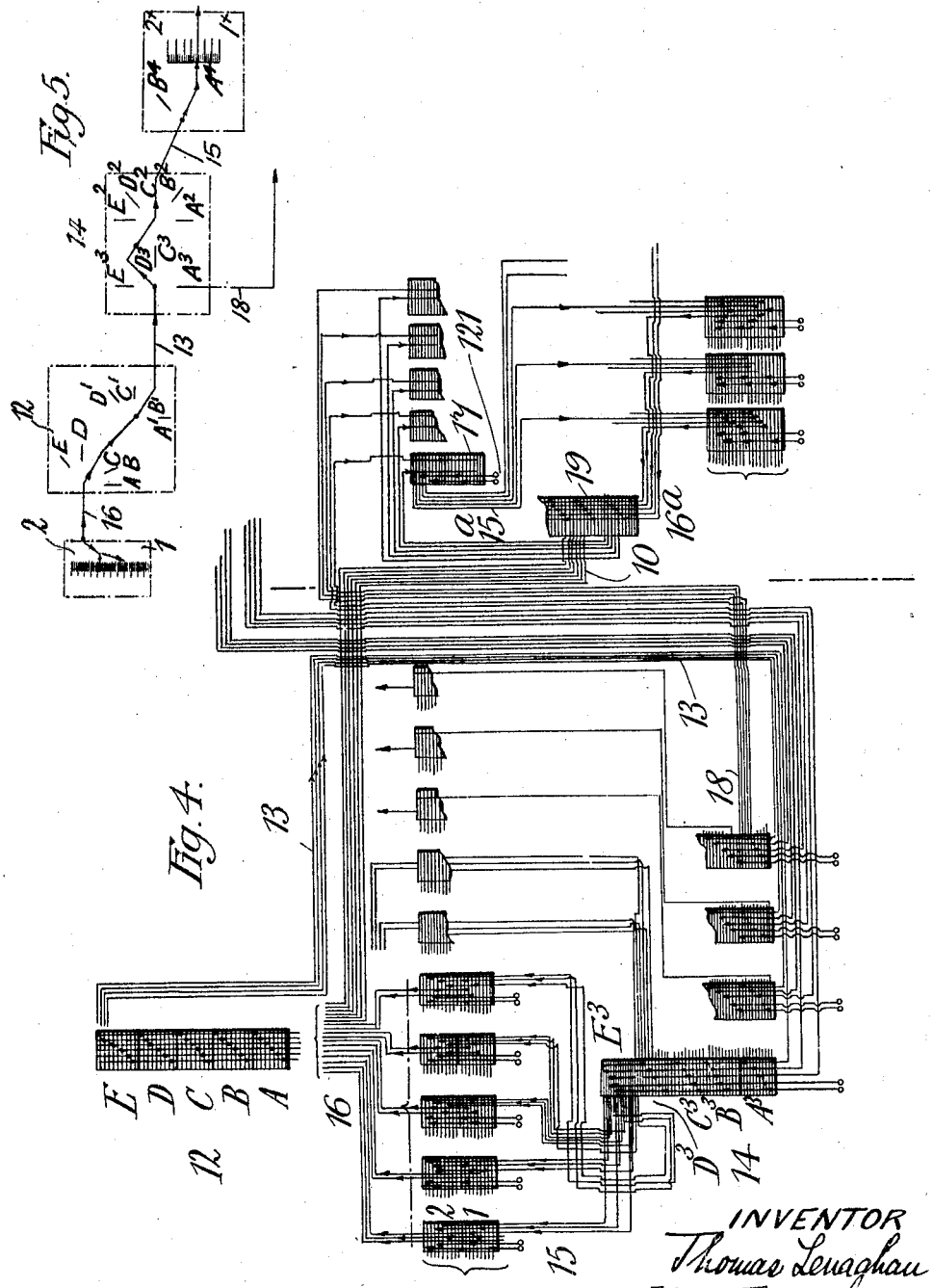

Oct. 30, 1923.
T. LENAGHAN
1,472,604
AUTOMATIC TELEPHONE SYSTEM
Filed April 28, 1920  19 Sheets-Sheet 3
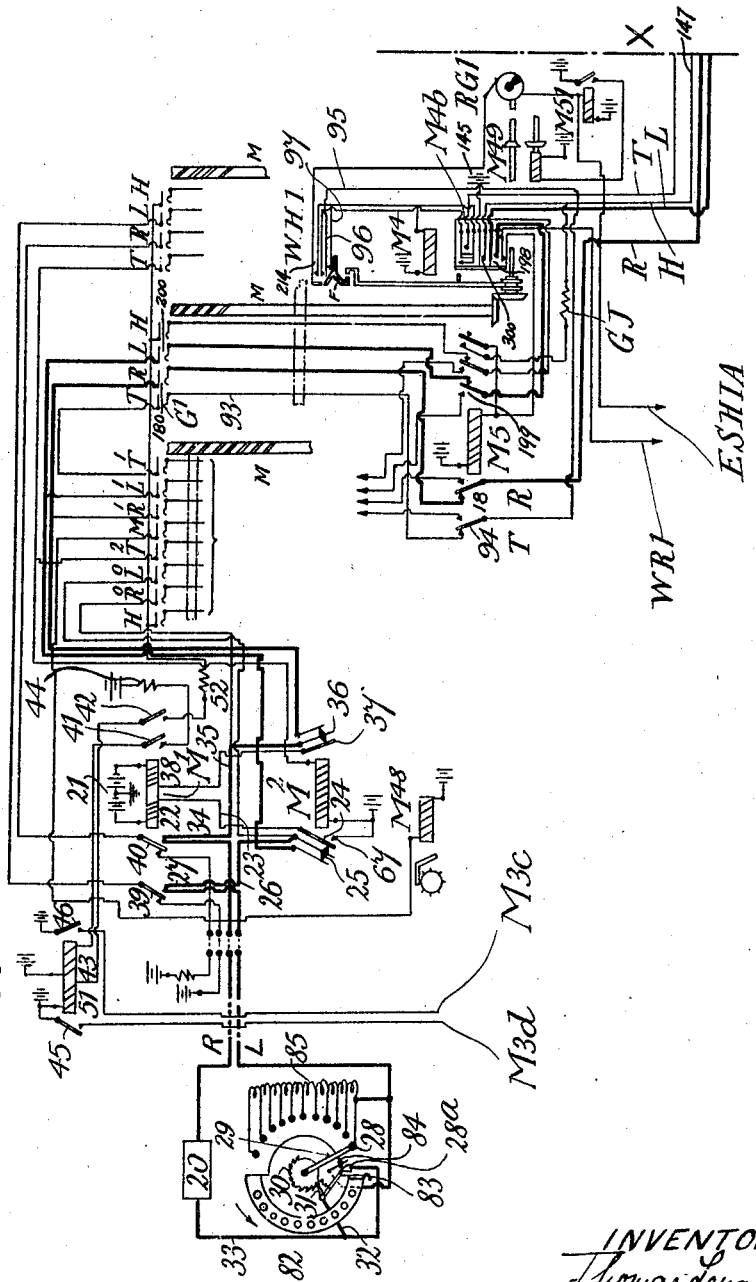
INVENTOR
Thomas Lenaghan
BY
Townsend & Decker
ATTORNEYS Oct. 30, 1923.

T. LENAGHAN 1,472,604

AUTOMATIC TELEPHONE SYSTEM

Filed April 28, 1920

19 Sheets-Sheet 5

INVENTOR
Thomas Lenaghan
BY Townsend & Decker
ATTORNEYS.

Oct. 30, 1923.

T. LENAGHAN 1,472,604

AUTOMATIC TELEPHONE SYSTEM

Filed April 28, 1920

19 Sheets-Sheet 6

Fig. 7.

INVENTOR
Thomas Lenaghan
BY
Townsend & Decker
ATTORNEYS

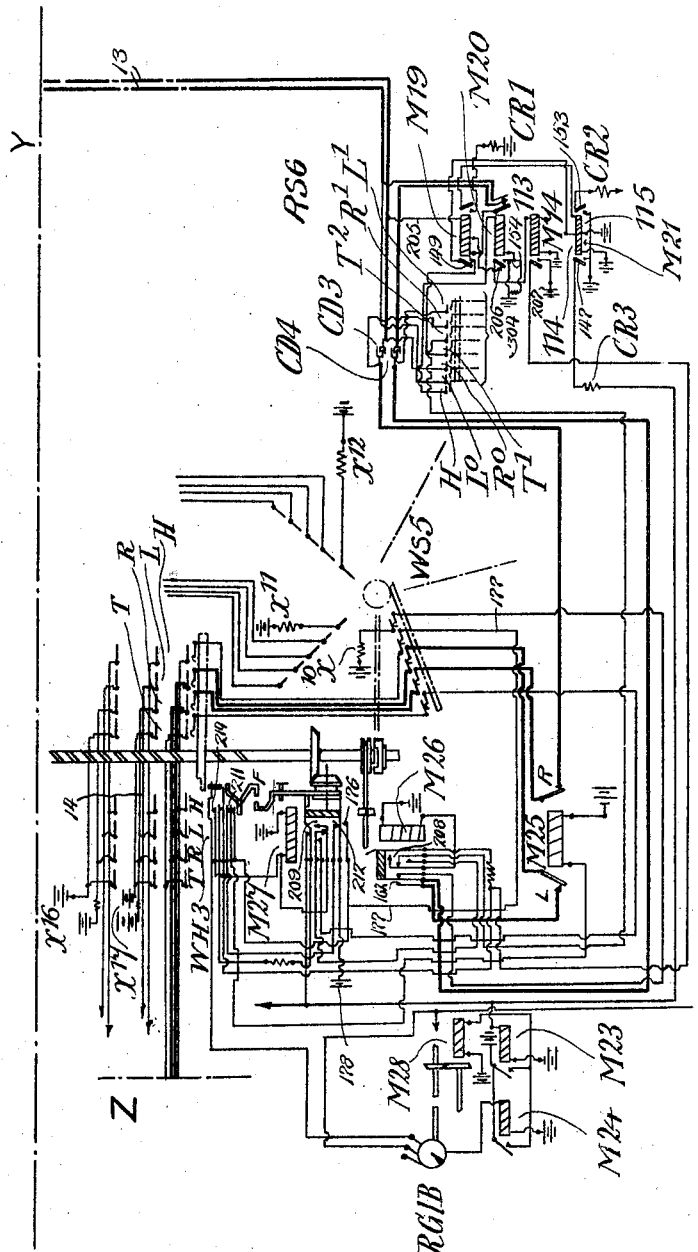

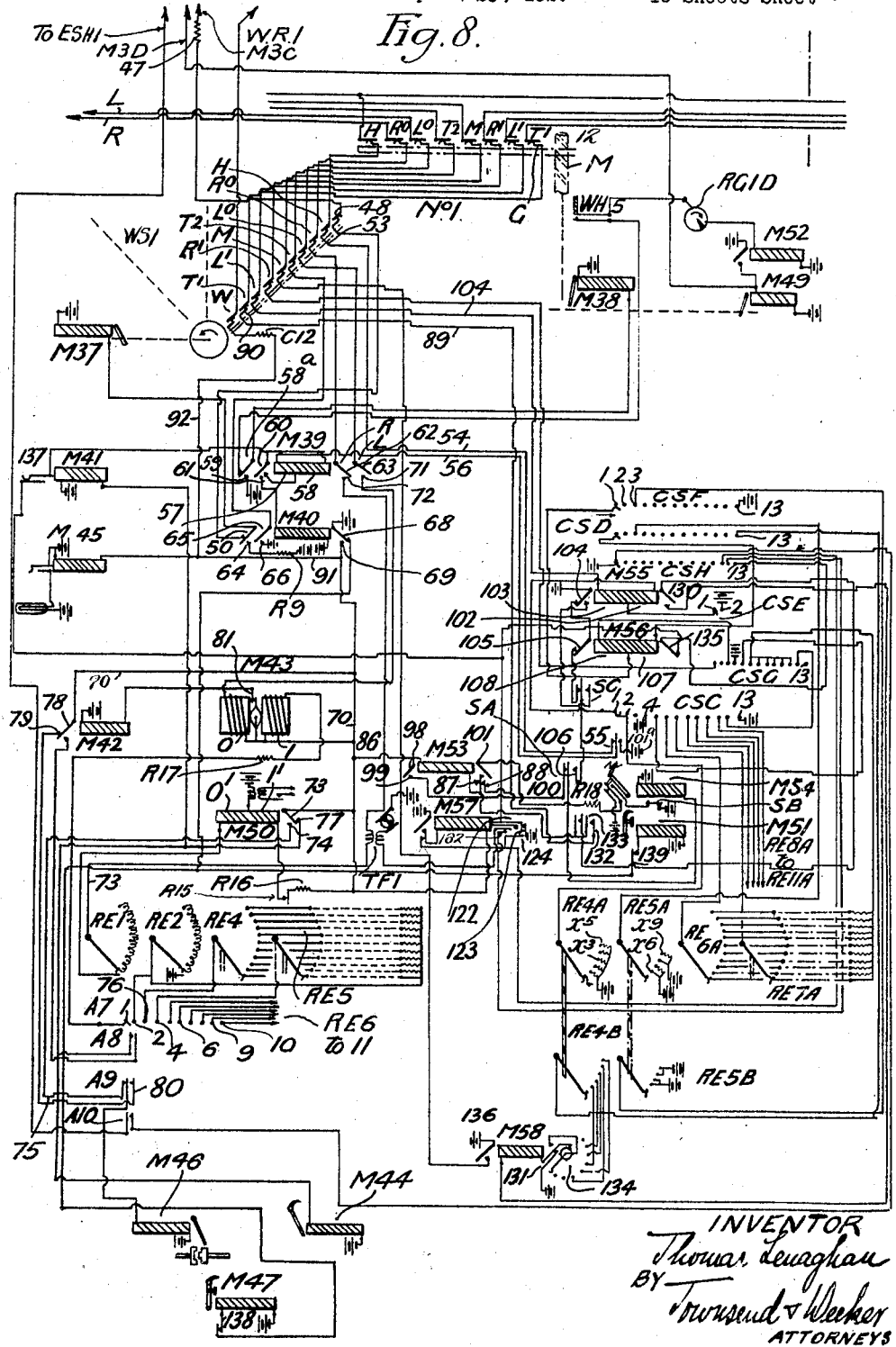

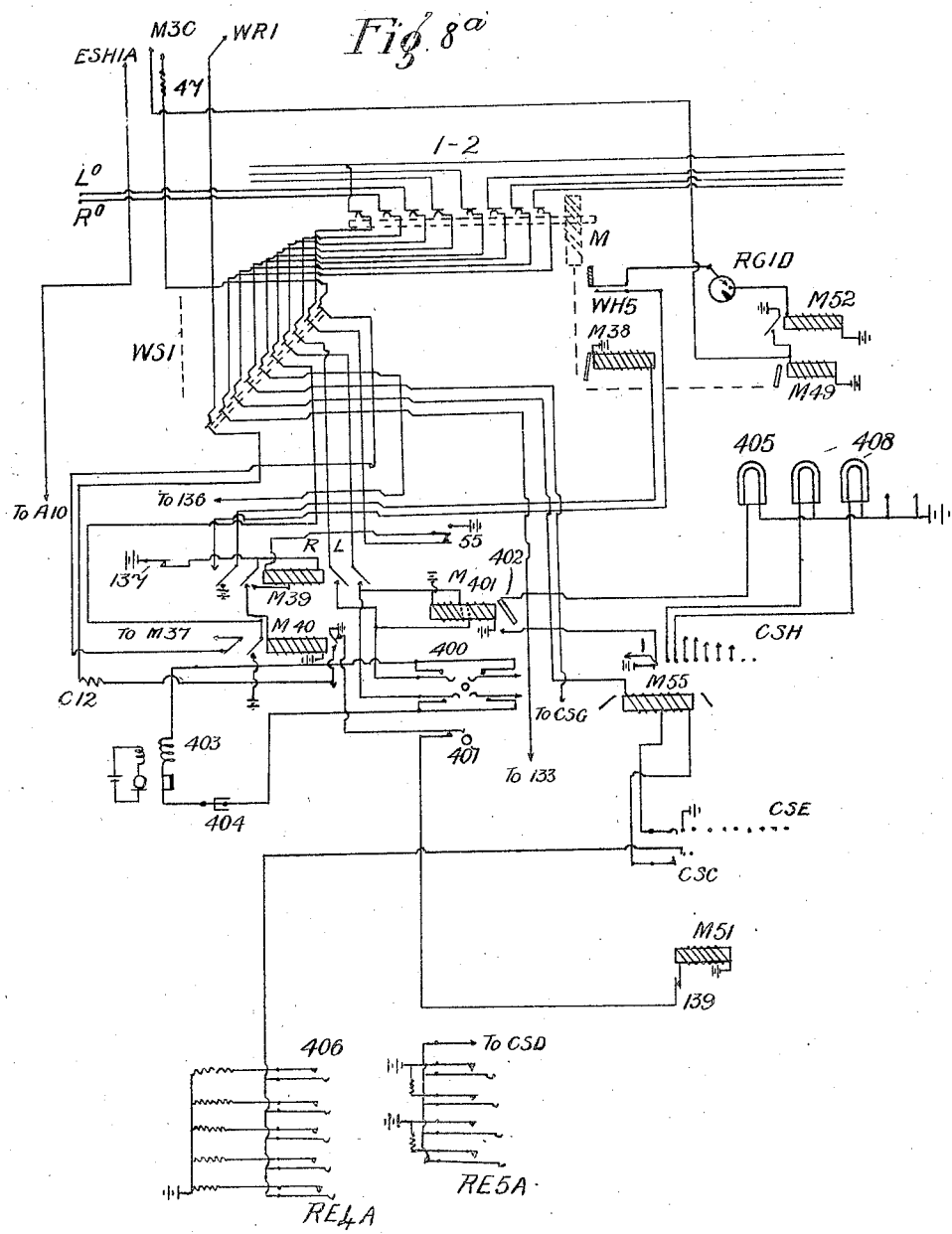

Oct. 30, 1923.
T. LENAGHAN
1,472,604
AUTOMATIC TELEPHONE SYSTEM
Filed April 28, 1920   19 Sheets-Sheet 11
Fig. 9ᵃ
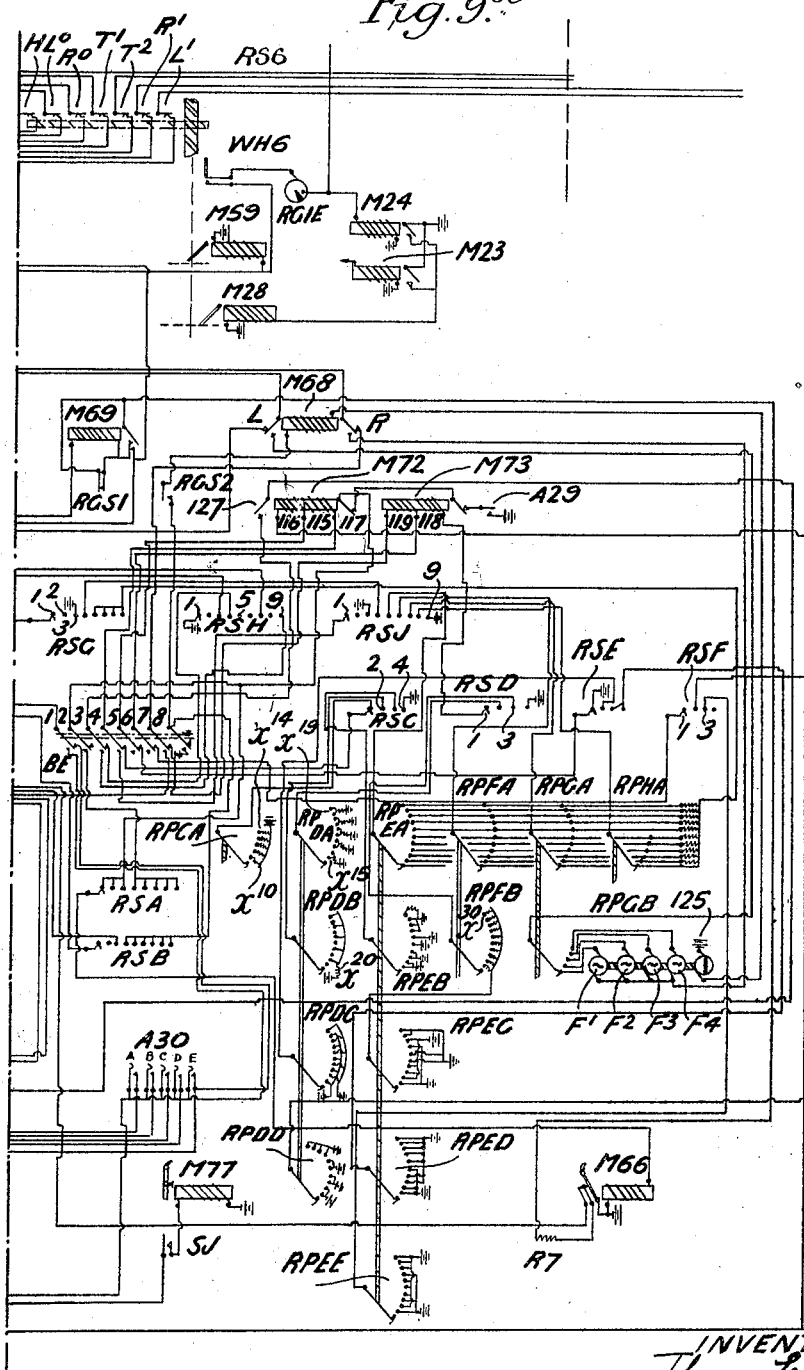
INVENTOR
Thomas Lenaghan
BY Townsend & Decker
ATTORNEYS.

Oct. 30, 1923.

T. LENAGHAN 1,472,604

AUTOMATIC TELEPHONE SYSTEM

Filed April 28, 1920     19 Sheets-Sheet 12

Oct. 30, 1923. 1,472,604
T. LENAGHAN
AUTOMATIC TELEPHONE SYSTEM
Filed April 28, 1920 19 Sheets-Sheet 13
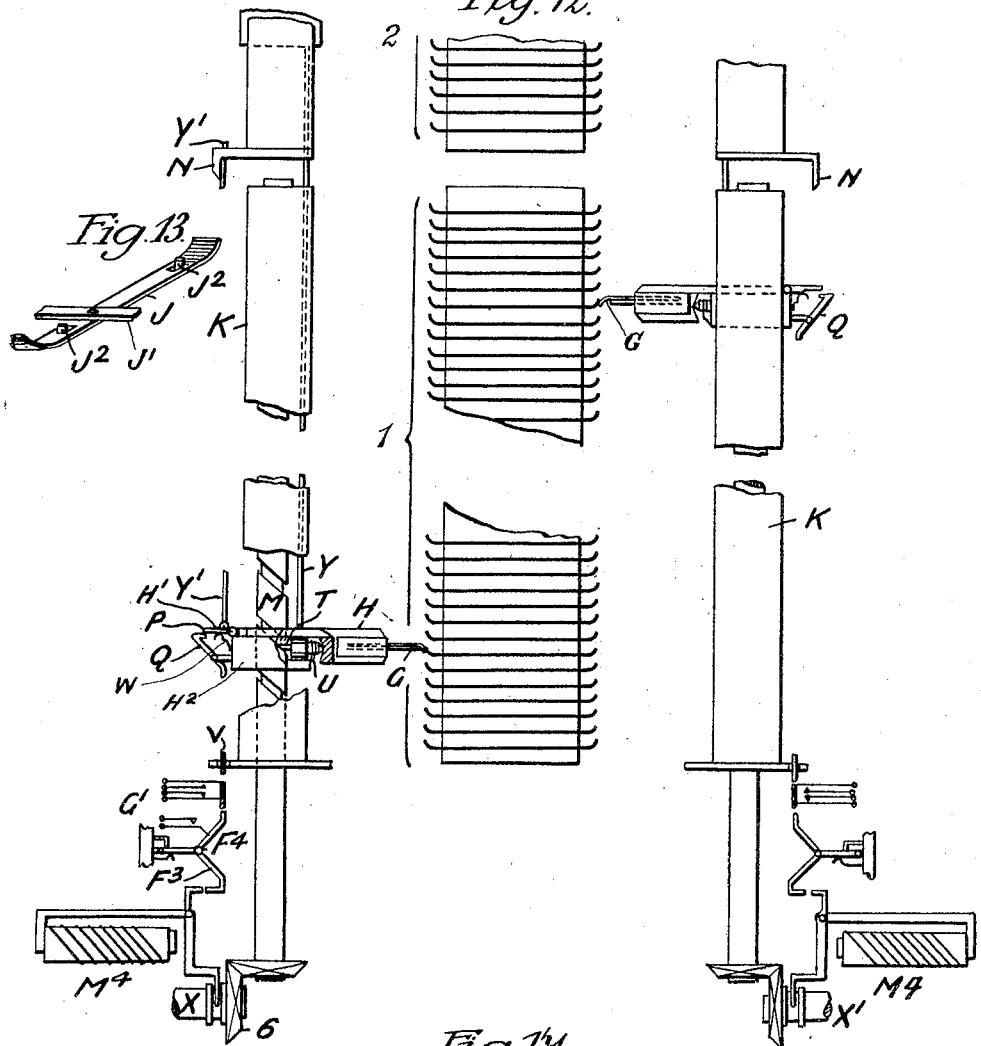

Oct. 30, 1923.

T. LENAGHAN 1,472,604

AUTOMATIC TELEPHONE SYSTEM

Filed April 28, 1920 19 Sheets-Sheet 14

INVENTOR
Thomas Lenaghan
BY Townsend & Decker
ATTORNEYS

Oct. 30, 1923.

T. LENAGHAN 1,472,604

AUTOMATIC TELEPHONE SYSTEM

Filed April 28, 1920

19 Sheets-Sheet 15

INVENTOR
Thomas Lenaghan
BY Townsend & Wecker
ATTORNEYS

Oct. 30, 1923.

T. LENAGHAN 1,472,604

AUTOMATIC TELEPHONE SYSTEM

Filed April 28, 1920     19 Sheets-Sheet 16

INVENTOR
Thomas Lenaghan
BY
Townsend & Decker
ATTORNEYS

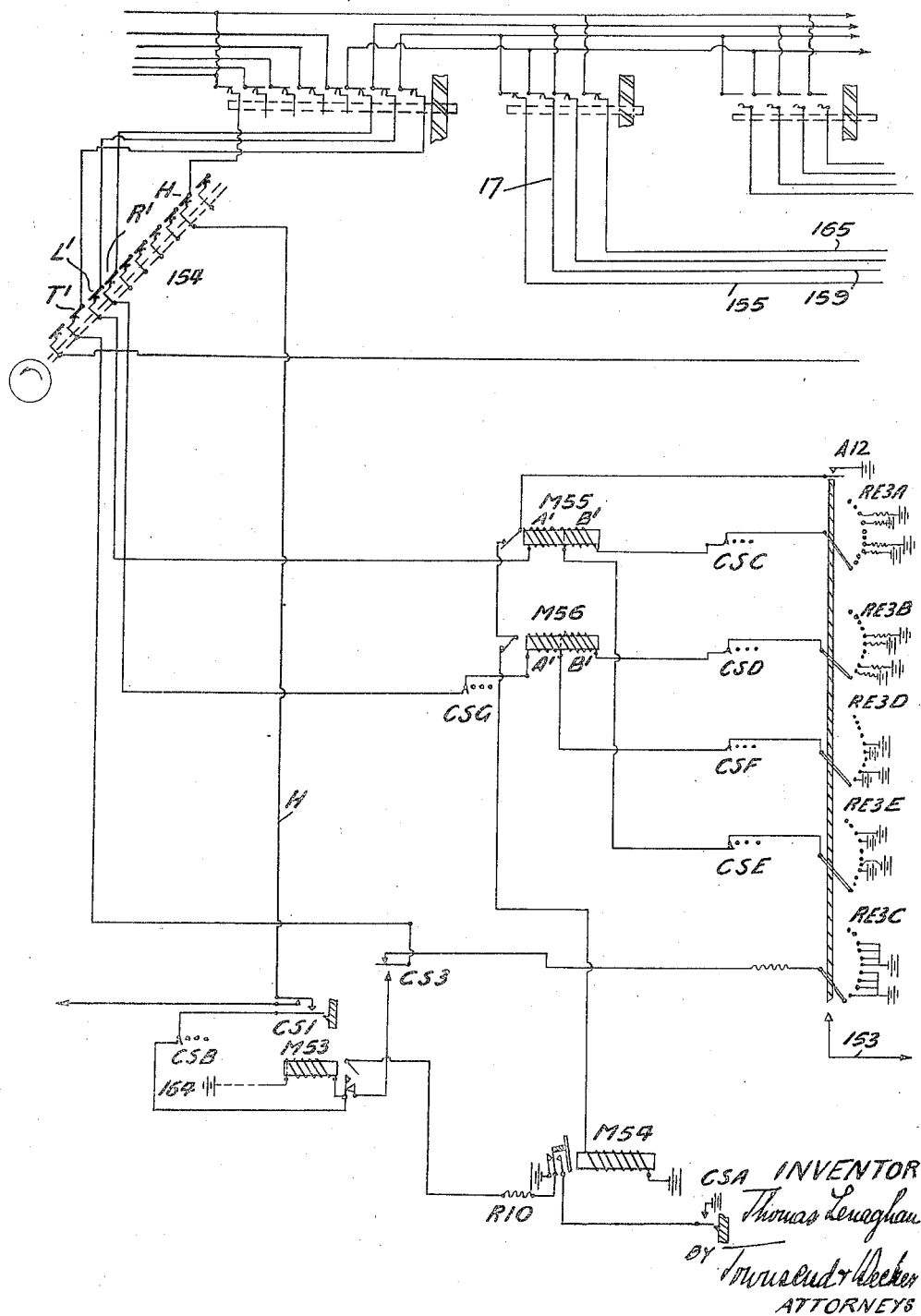

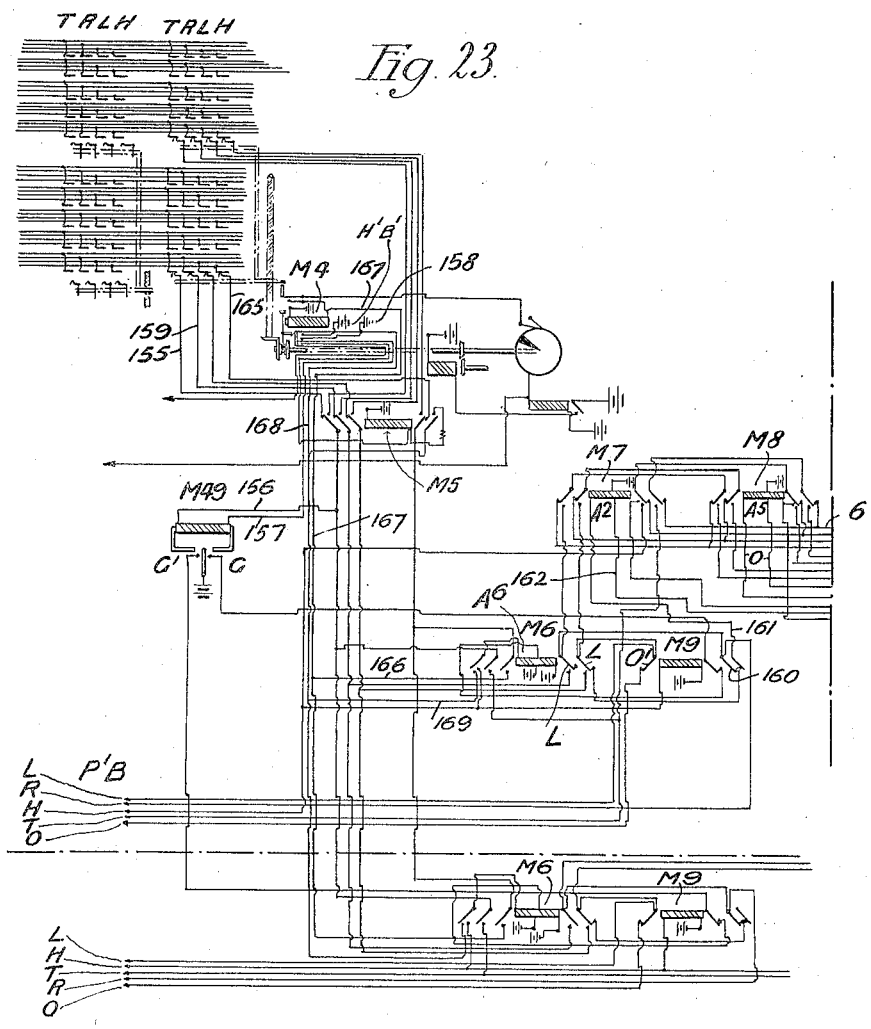

Patented Oct. 30, 1923.

1,472,604

UNITED STATES PATENT OFFICE.

THOMAS LENAGHAN, OF CROYDON, ENGLAND.

AUTOMATIC TELEPHONE SYSTEM.

Application filed April 28, 1920. Serial No. 377,288.

(GRANTED UNDER THE PROVISIONS OF THE ACT OF MARCH 3, 1921, 41 STAT. L., 1313.)

*To all whom it may concern:*

Be it known that I, THOMAS LENAGHAN, a subject of the King of Great Britain and Ireland, residing at Croydon, in the county of Surrey, England, have invented Improvements in Automatic Telephone Systems (for which I have filed applications in Great Britain April 23, 1919, Patent No. 152,702, and Oct. 23, 1919, Patent Numbers 153,167 and 153,168), of which the following is a specification.

This invention relates to telephone systems and it has for its object to effect certain improvements whereby automatic or semi-automatic operation is obtainable with various advantages such as those hereinafter appearing.

Broadly the invention consists in the employment in a telephone system, of an arrangement whereby selectivity of any particular portion of the system is consequent upon the balancing of electrical conditions purposely established at different parts of the system.

More specifically considered, the invention provides for an automatic telephone system in which the wanted groups, trunks and subscribers' lines are selected not by their respective position or positions but by the electrical condition or conditions found in the groups, trunks or lines by the seeking member or members temporarily associated with the calling line. This is accomplished by associating with each line or group of lines and with each trunk or group of connecting trunks a predetermined artificial electrical condition distinctive to the individual line or group, that is to say separate from the normal electrical condition of the said group or line, such condition only being available when one or more of the required lines or trunks is or are disengaged. Associated temporarily with the seeking member or members is a group of recorders on which are recorded, by the operation of the calling dial, the electrical conditions of the required groups and lines, a balancing circuit being connected in proper sequence to the various recorders and to the several seeking members, so that as soon as a seeking member finds a circuit having an electrical condition identical with that imposed upon the seeking member by the recorder, thereby setting up the required balance a relay is released so as to arrest this particular seeking member and extend the circuit to a seeking member in the next group when the succeeding recorder is brought into circuit giving the electrical condition with which the next balance is to be made, and so on until the wanted line is reached.

The setting of the recorders in response to the calling dial movements may be effected as ordinarily or be dependent upon the balancing of a series of electrical conditions extraneous to the normal electrical condition of the line calling that is to say inserted in, or imposed upon the circuit by operation of the dial. Such extraneous electrical condition may be due to resistance, to impedance, to capacity or to any suitable combination thereof.

Figure 2:
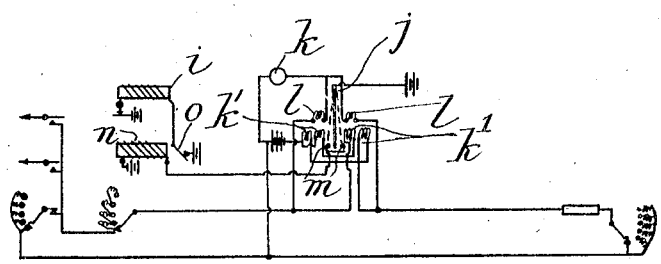
Figure 3:
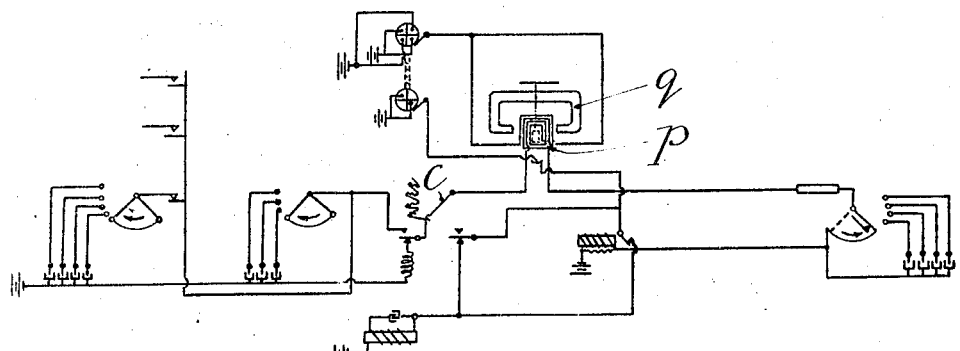

But in order that the invention may be more readily understood it will now be further described with reference to the accompanying drawings, whereof Figs. 1, 2 and 3 are diagrams chosen to illustrate several ways of carrying out the principle according to which electrical balance is made use of to secure selectivity. Fig. 4 is a diagram of so much of a scheme having a capacity of 280,000 lines, used as hereinafter set forth, as is necessary to understand the description about to be given of a circuit such as is indicated in sketch in Fig. 5. Figs. 6, 6ª, 7 and 7ª are four separated portions of a diagram, intended to be united along the lines X Y and Z, illustrating in detail a circuit equivalent to that outlined in Fig. 5. Fig. 6ᶜ is a face view and Fig. 6ᵈ a side view, to a larger scale, of the dial shown in Fig. 6. Figs. 8 and 8ª are diagrams of a recorder and Figs. 9 and 9ª the two portions of a diagram of a control repeater hereinafter more particularly referred to. Fig. 10 is a front elevation, Fig. 11 a plan and Fig. 12 a section corresponding to the line XII—XII Fig. 10 of a portion of one form of switch mechanism employed in carrying out the invention. Fig. 13 shows in perspective a detail of Fig. 12. Figs. 14 15, 16, 17 and 18 are diagrams serving to explain the function of the switching mechanism.

Figure 19:
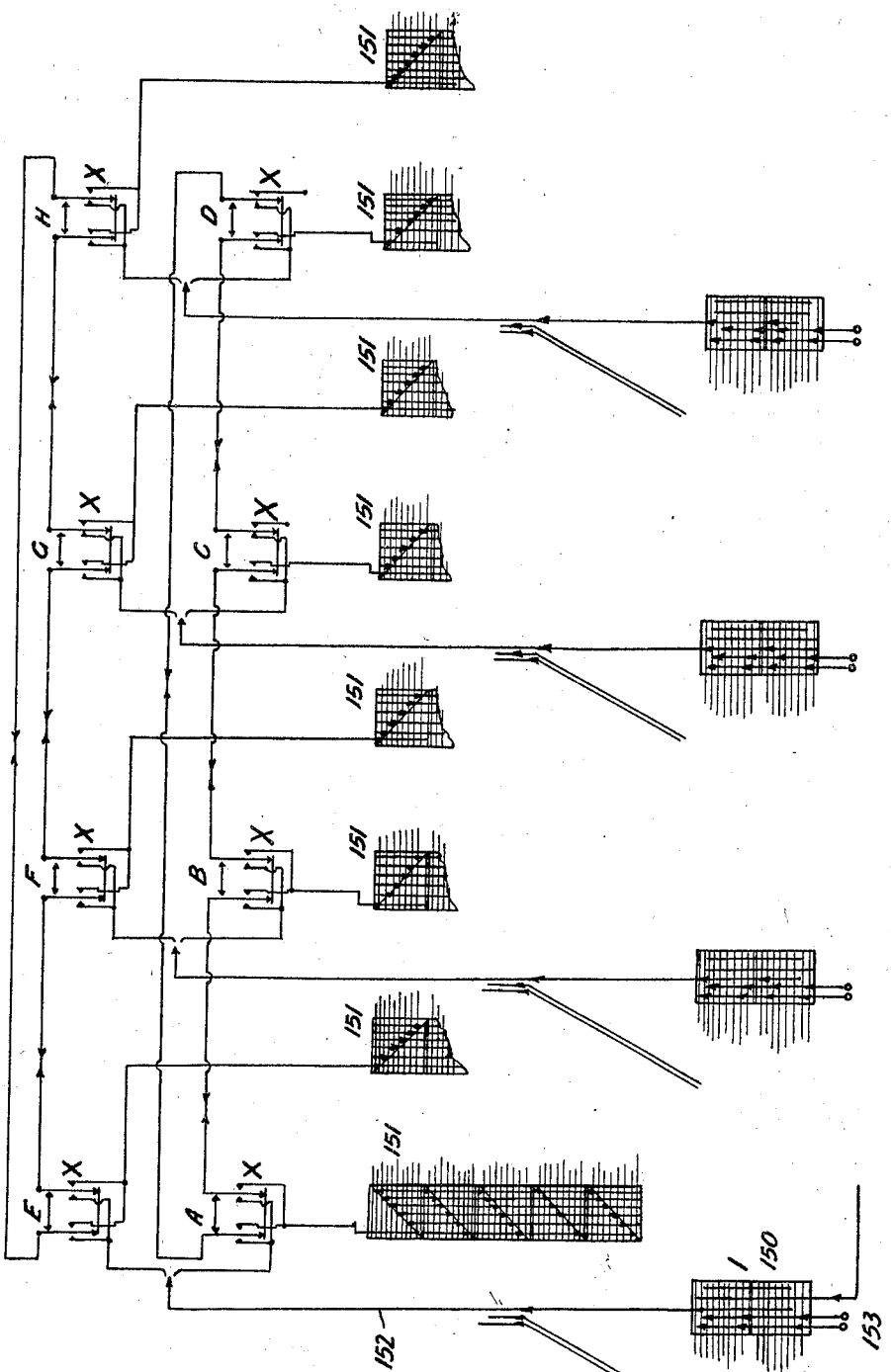
Figure 20:
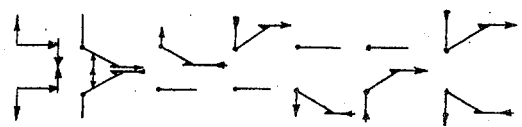
Figure 21:
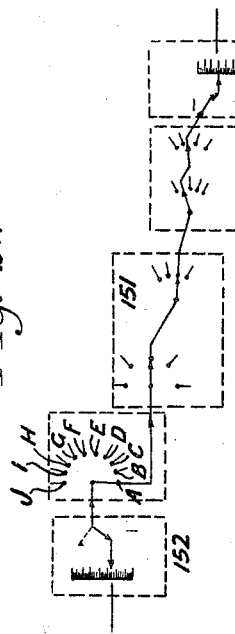
Figure 23A:
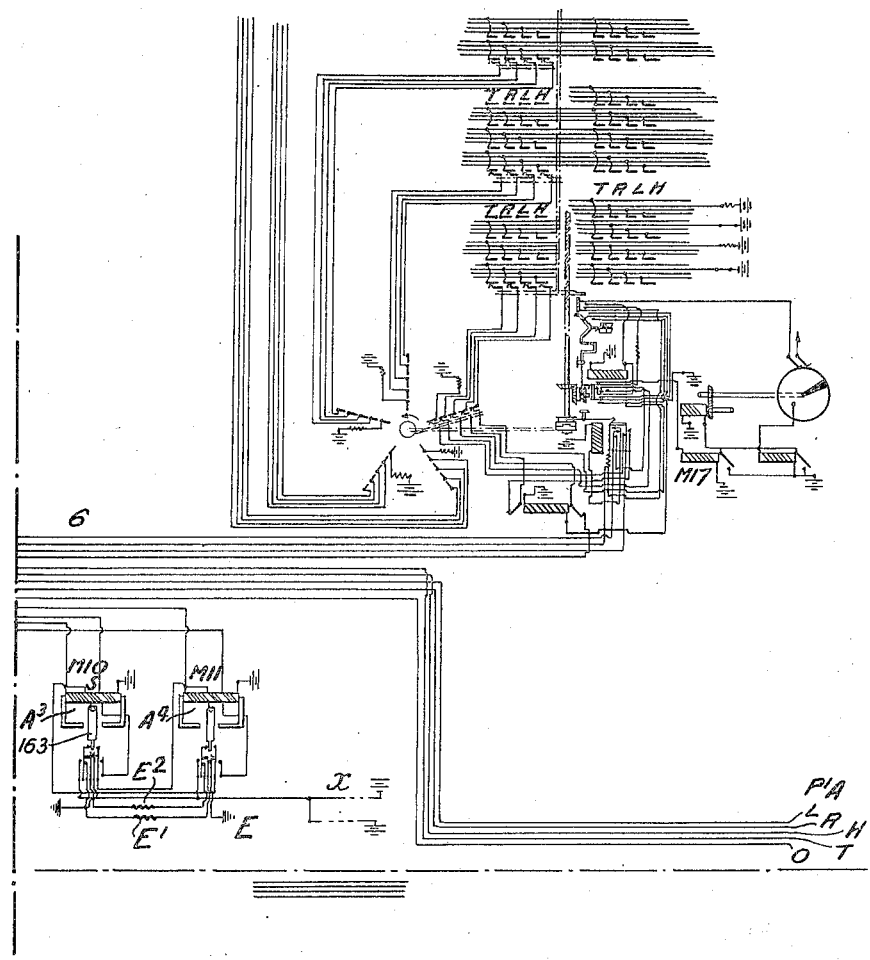

Fig. 19 is a diagram illustrating, by way of example, a trunking plan according to the invention for incorporation in the system illustrated by the preceding figures whereby without adding to the number of principal switches, through which the call has to progress, the capacity of such system is considerably increased. Fig. 20 is a collection of diagrams indicating the different circuit relationships obtainable with a number of relay or switching means employed in connection with Fig. 19. Fig. 21 is a diagram showing the improved type of trunk in relation to the remainder of the system. Fig. 22 is a diagram showing control circuits involved in the selection and tripping of the apparatus associated with the group trunk. Figs. 23 and 23$^a$ are two portions of a diagram showing the circuits in greater detail.

Referring first to Fig. 1 which illustrates the feature of balancing with resistances, $a$ represents the arm of a rheostatic calling dial, $b$ represents the arm of a corresponding record ballast and $c$ represents the arm of a variable line ballast, $d$ is a balancing magnet having windings $e$, $f$ so connected to the subscriber's line, line ballast, record ballast and a battery $g$ that they are traversed by current tending to nullify their magnetizing effect. If, however, as would always be the case, the portion of the circuit that includes the winding $f$ possesses a greater resistance than the portion that includes the winding $e$ the magnetizing effect of the latter will preponderate and thus normally cause the magnet $d$ to attract an armature $h$ controlling the circuit of a trip relay $i$. By moving the line ballast arm $c$, an amount of resistance can be included in circuit to cause the effects of the windings $e$ $f$ to become balanced whereupon the armature $h$ will be released thereby closing the circuit of the trip relay $i$ which is adapted to arrest the arm $c$ in its proper position and to extend the circuit successively to the ballast of the various digit registers employed. The line being thus balanced it will be obvious that the arm $a$ of the calling dial can be manipulated to insert any desired amount of resistance to destroy the balance, which is then again restored by a corresponding movement of the arm $b$ of the identical register ballast, the circuit of the trip magnet $i$ being as already described first interrupted and then completed to arrest the arm $b$ in balancing position.

Fig. 2 is a similar diagram in which the balance is effected between impedances incorporated in the calling dial, the record ballast and the line ballast. In this case a vibratory reed $j$ may be employed, tuned to the frequency of a high frequency generator $k$. Acting on the reed $j$ are compensating coils $k^1$ and phase coils $l$ so connected that when the currents in the phase coils $l$, to which are connected the line and ballast circuits, vary in lag a vibratory motion is imparted to the reed, thereby closing, through the contacts $m$, the circuit of a magnet $n$ which attracts an armature $o$ and holds the circuit of the trip relay $i$ open until the currents in the respective circuits are balanced through being brought into phase.

In Fig. 3, which illustrates the use of capacities in the calling dial and records, the line circuit is first balanced by a line resistance ballast with arm $c$ as in Fig. 1. The subsequent balance between the capacities is shown as controlled by a coil member $p$ suspended in a magnetic field due to a magnet $q$. After the resistance balancing, the balancing condition is obtained by balancing by variable capacity the capacity of the calling line. Thereafter, the dial movement by inserting extraneous capacity unbalances the circuit until rebalanced by the variable capacity on the dial records.

Before proceeding to describe the systems chosen for illustration, a switch construction employed in accordance with the invention will be explained.

Broadly the invention includes a switch apparatus wherein the functions of a preselector, selector and connector are combined, the subscribers' lines being connected to a series of horizontal punchings individual to one level, of the several levels, of a vertical bank or banks. The said banks do not form part of this specification, being included herein merely to show the switch functions, and are fully described in my co-pending application.

The aforesaid banks are capable of being wiped over on their front and rear faces by a number of multiple wipers, travelling in a vertical plane, by the action of power driven screw spindles, which wipers only make contact with the bank on their upward travel, on the completion of which the wipers return to the bottom of the bank by gravity force, where they are re-engaged by the screws, the connection between the said screws and the power drive being under the control of a trip mechanism.

Figure 10:
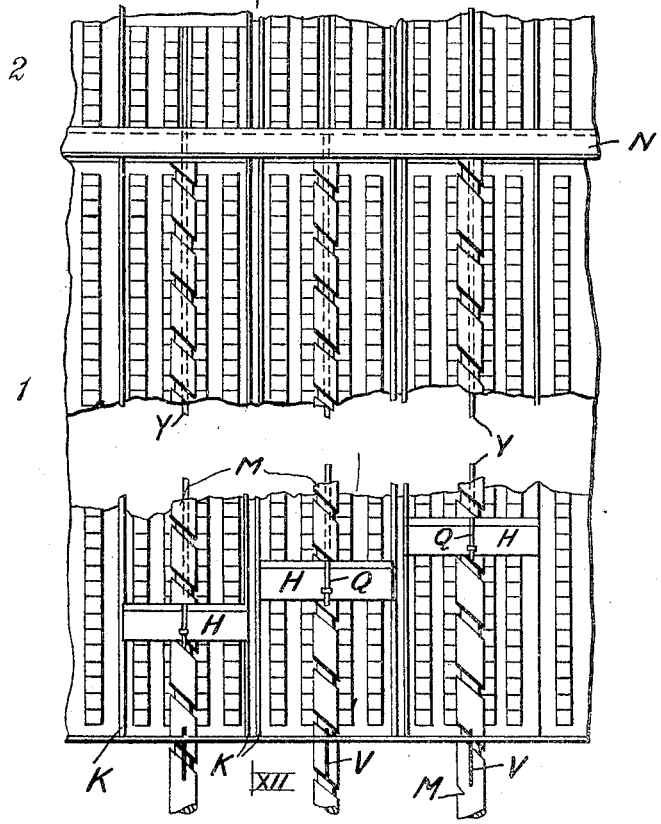
Figure 11:
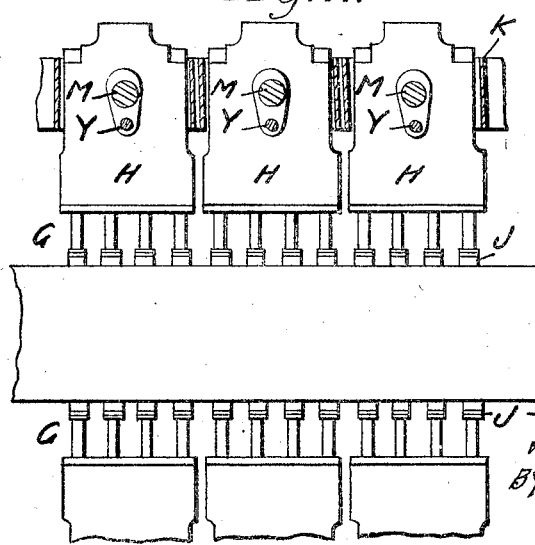
Figure 14:
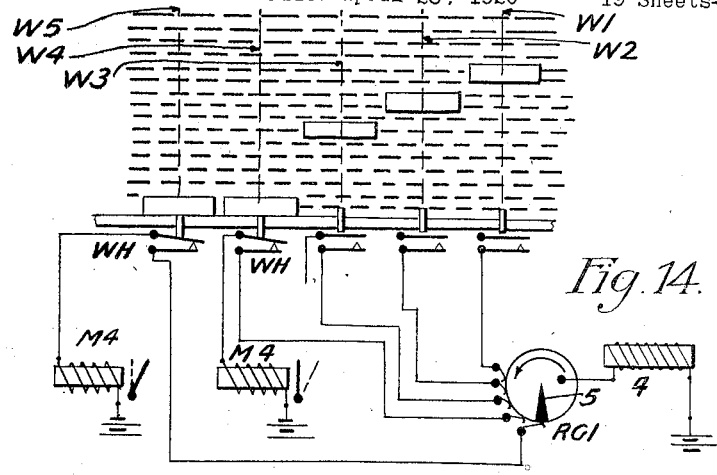

Referring to Figs. 10, 11 and 12, the switches are of the power driven type, having access to two or more banks 1—2 of 100 horizontal rows of punchings J, one of which latter is shown alone in Fig. 13.

Travelling in a vertical plane in front and rear of the said banks are a number of multiple finger wipers G. Each such multiple wiper associated with the lowermost bank 1 of punchings J is actuated by a worm M and the corresponding wiper or wipers above it, associated with the bank 2 or further banks, may be caused to move in unison with the lower wiper either by an additional worm section or sections coupled to the worm M or, as shown, by means of a rod Y, attached to the lowermost wiper carriage H all of which carriages slide in guide bars K. These guides also carry the necessary conductors which, in any convenient way, conduct current to the wiper fingers G. These fingers G only make contact with the bank punchings J on their upward travel, for which purpose each lower carriage H is pivoted at $H^1$ to a carrier $H^2$ and provided with a tongue P adapted as it approaches the upward limit of its travel to engage a stationary bar N and be forced, against the action of a spring W, under a catch Q pivoted to the carriage $H^2$, the arc which the fingers G thus described causing their points to clear the punchings J. This angular movement of the carriage H at the same time allows of a pin T fitted in the carrier $H^2$ and which is normally held in engagement with the screw M, to be forced by a spring U out of such engagement, whereupon the carriage H and carrier $H^2$ can descend by gravity to the bottom of the bank, where the catch Q is forced free of the tongue P by a pin V, allowing the spring W to restore the carriage H to the position shown, the pin T being again engaged with the screw M. The upper carriage H may be the same as and operate in the same way as the lower carriage, when upper screw sections are employed, but where their actuation is due to means such as rods Y it will only be necessary to pivot them to their carriers $H^2$ and transmit the angular motion of the lower carriage H to an upper one, when descent is to be made, by means such as a rod $Y^1$ connecting the tongue P to an equivalent tongue upon a carriage above. The position of the various multiple wipers G is so governed in their relation to each other and to their drive shafts X $X^1$ that, starting from rest and whilst remaining vertically equidistant from each other, thus allowing of a minimum travel in searching for a punching they progress successively whilst disengaged. This may be achieved by the arrangement shown in Fig. 14 where the wipers corresponding to the lines $W^1$ $W^2$ $W^3$ and $W^5$ are in their proper positions but the wiper at line $W^4$ is not. According to this arrangement the shaft X, or $X^1$, is provided with a regulator $RG^1$ of conducting metal electrically connected to a source of current through the winding of a starting relay 4 and containing a segment 5 of insulating material. The screw M of each wiper is adapted to be connected to its drive shaft X or $X^1$, by a clutch 6 Fig. 12 the associated disconnecting relays $M^4$ of all of which are adapted to be energized through the regulator $RG^1$ and contacts W H except when the insulating segment 5 passes the brushes of the various circuits which it does in predetermined order. Thus on a wiper carriage reaching the bottom position, but out of its regular sequence as at line $W^4$ the corresponding relay $M^4$ will be energized and remain energized so as to keep the clutch 6 open until such time as the rotation of $RG^1$ disconnect the circuit of $M^4$. The regulator $RG^1$ thus acts to release the clutches in proper sequence due to the successive interruption of the circuits of the relays $M^4$ by the insulating segment. In the figure the said insulating segment is shown in position starting the last wiper carriage at $w^5$ into action. The said relays $M^4$ are also used to operate a number of contact springs as shown in Figs. 6 and 7, the operations of which are in a downward direction on the relays operating, and are fully described hereinafter in relation to their associated circuits.

Figure 15:
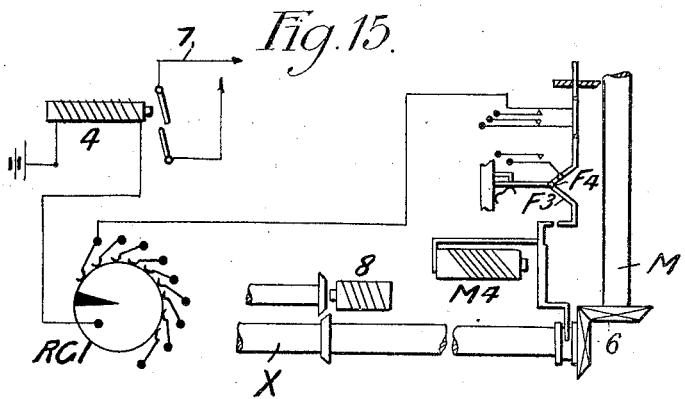
Figure 18:
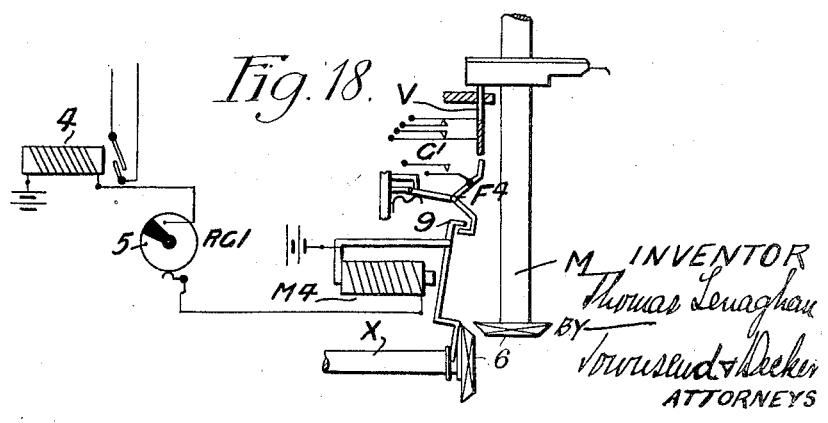

In Fig. 15, 7 represent the leads forming part of the circuit of a magnetic clutch 8 through which motion is transmitted to the driving shaft X or $X^1$, the said circuit being controlled by the starting relay 4, this figure illustrating also the spider arrangement shown in Fig. 12 which will now be described. When any particular wiper in the course of its travel encounters a punching J possessing the requisite electrical condition to establish a balance, a trip relay is caused to release, as hereinafter explained, and in so doing sends a current through the trip magnet $M^4$ corresponding to the wiper in question which in operating disconnects the worm M from the shaft X or $X^1$, as shown in Fig. 16. At the same time a tongue 9 on the clutch actuating armature of the relay $M^4$ forces a spider $F^3$ of the shape shown, from the position in Fig. 15 to that of Fig. 16 thereby bringing a pair of contacts $G^1$ into engagement, the spider arm remaining in this position, on the trip relay $M^4$ releasing, owing to frictionally mounted pivotal contacts at $F^4$. On the connection terminating, the relay $M^4$ is released and the wiper carriage resumes its travel, irrespective of its position relative to the other wipers, until the bottom of the bank is reached, but during this operation the wiper fingers in question are electrically disconnected from the circuit due to the circuit completed at the contacts $G^1$ aforesaid and the back contacts $G^2$ Fig. 17, of the relay $M^4$, which circuit includes a relay B R controlling the leads 10 connected to the wiper, and the trunk leads 11. On the wiper carriage reaching the bottom position, the pin V is displaced and causes the spider $F^3$ to assume the position shown in Fig. 18, the relay $M^4$ being again operated until released by the controller $RG^1$ when the carriage resumes its upward travel allowing spring $S^1$ to restore the frictionally mounted pivotal contacts $F^4$ to the position shown in Fig. 15.

Reverting now to Fig. 5, two line switch banks 1, 2 such as described in my co-pending application, filed Nov. 2, 1920, Ser. No.

421,382, are shown associated with an out trunk switch 12 dealing with 5 main exchange groups at A, B, C, D and E each of 20,000 lines, and at $A^1$ $B^1$ $C^1$ $D^1$ with 4 primary trunk groups appertaining to 5,000 lines each comprising one such main exchange. 14 represents the incoming trunk switch dealing at $A^2$ $B^2$ $C^2$ $D^2$ $E^2$ with 5 primary line groups of 200 lines each and at $A^3$ $B^3$ $C^3$ $D^3$ $E^3$ with five secondary trunk groups appertaining to 1,000 lines each. The subscribers' lines terminate on the horizontal punchings J of the line switches each of which has, as assumed, a capacity of 200 lines subdivided into two groups of 100 lines. Having access to the aforesaid punchings are a number of multiple wipers such as G already described, some of which are connected for handling outgoing calls, some for incoming calls and others for effecting the temporary connection of control recorders.

Outgoing calls, that is to say, originating calls, are carried from the line switch 1, 2, to the out trunk switch 12 via trunks 16 whence the connection is extended via out trunks 13 to the incoming trunk switch 14, and via incoming trunks 15 to the line switch 1, 2, in which the wanted subscriber is located. This particular system, without employing branch exchanges, has a capacity of 100,000 lines and the connections illustrated are those corresponding to a call to line C B 4315 that is to say through main exchange C primary trunk group $B^1$ and secondary trunk group $D^3$, primary line group $C^2$ and secondary line group $A^4$.

In Fig. 4 the principal elements involved in such a call are shown in greater detail. Here the five line switches 1, 2 shown bracketed together, represent a secondary trunk group having a capacity of 1,000 lines, each line switch being adapted to be connected to either of the sections A, B, C, D, E corresponding to the 5 main exchanges, by way of the line trunks 16. The outgoing trunks 13 corresponding to the four primary groups of section E of the "out" trunk switch 12 are shown, each connected to a corresponding incoming trunk switch 14, the switch sections $A^3$ $B^3$ $C^3$ $D^3$ and $E^3$ of which have each incoming trunks 15 corresponding to the primary line groups $A^2$ $B^2$ $C^2$ $D^2$ $E^2$ leading to the line switches 1, 2.

In addition, calls to a branch exchange of 10,000 line capacity are provided for, being carried from one of the incoming trunk switches 14 via incoming branch trunks 18 (indicated also in Fig. 5) to incoming trunk switches 17, thence via incoming trunks $15^a$ to the line switches as before. Outgoing calls from branch exchange lines proceed over line trunks $16^a$ to an outgoing branch trunk switch 19 for connection to either the main or branch exchange as required. The scheme thus augmented by one branch exchange per secondary group is increased in capacity to 280,000 lines. The direction of traffic in both Figs. 4 and 5 is indicated by the arrow heads.

To obtain a general idea of the steps involved in the operation of such a system it may be explained that on a subscriber removing the receiver from the telephone to initiate a call a battery feed relay associated with that particular line is operated, thereby unbalancing a relay common to a given group of lines which operating serves to start control recorders seeking the calling line. When this line is found it is extended to the balancing circuit on the control recorder. The connection in circuit of the control recorder also results in operation of a cut off relay adapted to clear the line for balancing purposes. On the line being balanced, as hereinafter fully described digit records are received on the dial ballasts previously alluded to. On the receipt of the first digit, the control recorder commences seeking for a trunk having an electrical condition the same as that set up on the recorder. In the particular system under consideration the first selection, that is to say the required exchange group is effected by wiper selection on the out trunk switch 12, Figs. 4 and 5 the wiper facing the bank containing trunks to the desired exchange being alone electrically connected. This selection is governed by resistance balance.

The next selection, that is to say a trunk to the wanted exchange also embraces the selection of the particular primary trunk group at $A^1$ $B^1$ $C^1$ $D^1$ leading to the group in that exchange in which is located the wanted line. This selection is by the bank wiper seeking a definite polarity and resistance.

The circuit is now extended to the incoming trunk switch 14 where a control repeater is brought into circuit which firstly balances the trunk line in the same manner as the control recorder balanced the calling line, secondly balances and registers the remaining digit records recorded on the control recorder and thirdly completes the building up of the construction.

The next selection is the secondary trunk group (i. e., 1,000 line group) at $A^3$ $B^3$ $C^3$ $D^3$ or $E^3$, which is done by wiper selection to the bank on the incoming trunk switch 14 and is governed by resistance balance.

The succeeding selection, that is to say, primary 200 line group at $A^2$ $B^2$ $C^2$ $D^2$ or $E^2$, is via bank punchings of trunks 15 leading to the line switch in which is located the wanted line. This selection also embraces wiper selection on the line switch as between odd and even hundreds and is determined by polarity on what is termed the L side of the trunk and by polarity and resistance on the opposite or R side of the trunk.

The final selection, that is to say the wanted line is by wiper selection over the punchings of the line switch bank and involves a combination of polarity and resistance on both the L and R sides of the trunk.

Should the wanted line be engaged, thus preventing this balance being obtained, a time limit can be allowed, after obtaining the preceding balance, at the end of which, if connection is not made, a busy signal will be given and the connection thus far completed terminated. This is accomplished by preventing the transfer of the final register from the control recorder until a trunk to the primary line group is obtained.

In the event of the required line being disengaged, intermittent ringing current is applied to the called line and, on the subscriber answering, an indication is sent back to the control recorder which sends out to the calling subscriber's line meter a number of operating impulses corresponding to the charge to the area in which the wanted line is located. On completion of the building of the connection the control recorder disengages from the connection, causing in turn the disconnection of the control repeater, the connection from the calling line to the called line being under the control of the calling line and the called line switch being controlled by the called subscriber, although if desired, the whole connection may be controlled by the calling line.

At the expiration of a given period of time the connection is automatically disengaged after providing a warning tone.

From what has been said the description now about to be given with regard to the diagrams shown in Figs. 6, 6$^a$, 7 and 7$^a$ and 8 will be readily understood, so that it will only be necessary to set out the function of the various parts, which are illustrated in normal position.

On a subscriber removing the receiver at telephone 20 to initiate a call, a circuit is completed from battery 21 (Fig. 6) through winding 22 of a battery feed relay N$^1$ thence by lead 23, armature 24 of relay M$^2$ contact by lead 26, contact 27 and line L to contact 25, lead 26, contact 27 and line L to contact 28 and stop 28$^a$ of the calling dial the said calling dial being shown in greater detail in Figs. 6$^c$ and 6$^d$ wherein 82 is the finger plate, 82$^a$ the return spring, 83 the finger stop, 82$^b$ a friction brake, 28$^a$ a contact block, 28 the normal stud, 28$^b$ the selecting studs, 29 the selecting arm, 84 a spring contact, 30 the ratchet of 29, 31 a pivoted pawl and 31$^a$ the return spring of arm 29. On the finger plate 82 being rotated by one of the finger holes until the stop 83 is reached, the arm 29 is carried round the studs 28$^b$ to which are connected the resistance coils 83, and during the forward movement of 82 the contact between arm 29 and contact piece 28$^a$ is completed by spring 84 for the purpose hereinafter shown. On the finger stop 83 being reached plate 82 is returned to normal position by the action of spring 82$^a$, the return being retarded by the brake 82$^b$, during the foregoing return movement contact 84 is separated from both 28$^a$ and 29. The circuit now being completed by way of pawl 31, (which engaged the ratchet 30 on the commencement of the forward movement of 82) and ratchet 30 which holds the arm 29 on the selected stud 28$^b$ until the finger plate returns to normal when the pawl is released from the ratchet by the stop 28$^a$; the said release of pawl 31 allows arm 29 to return to normal by the action spring 31$^a$ during which return movement the line circuit is disconnected by the withdrawal of pawl 31, until the return to normal when the contacts 28$^a$ 29 and 84 are again closed, the purpose of the foregoing disconnection being hereinafter explained, continuing the circuit from the L line, as previously described, to contact 28 and top 28$^a$, Fig. 6, in parallel, through arm 29 of the latter, lead 33, telephone 20 line R contact 34 lead 35 contact 36 armature 37 of relay M$^2$ and coil 38 of relay M$^1$ back to battery, the relay coils 22 and 38 being thus both in series with the line circuit so that relay M$^1$ actuates the four armatures 39, 40, 41, 42 associated therewith. The armature 41 completes a circuit through winding 43 of a relay M$^3$, common to a group of lines, via a resistance coil 44. Relay M$^3$ thus operates to close, through armatures 45, 46, circuits M$^{3c}$ M$^{3d}$ for a continuation of which see Fig. 8. The circuit by way of M$^{3c}$ places a potential, via resistance 47 (Fig. 8) on the wiper switch punchings WS$^1$ 48 associated with the bank wipers having access to the calling line, the said wiper switches being of a rotary, multi-finger power driven type, capable of sweeping over groups of contacts associated with the several bank wipers, the circuit aforesaid being completed through the windings of relays M37 (wiper trip relays) of disengaged control recorders, by way of the armature 50 of a relay M40, the function of which relay, i. e., M37 is to arrest the wiper switch in the position where such circuit is completed. M3d circuit includes the winding of a relay M49 which operating starts the travel of the control recorder screws M and wiper switches WS1, seeking the calling line which is ascertained by the potential found on the H punching of the line switch derived from the winding 51 of relay M$^3$ Fig. 6 by way of the armature 42 of the relay M1 and resistance coil 52. This potential is applied through the corresponding punch H of the wiper switch and the wiper 53 by way of lead 54 contact 55 and lead 56 and the windings 57 58 of relay M39 contact 137 to negative battery at 124, consequently causing relay M39 to operate which firstly closes, through armature 58$^a$ and contact 59, a circuit including the winding of a relay M38 to negative battery. M38 operating disconnects the wiper screw M from its shaft X or X$^1$ as previously explained, secondly closes, through aramture 60 and contact 61 a circuit from the winding of relay M40 and at the same time short circuits the winding 58 of relay M39 thus reducing the potential on the H punching of the line switch to prevent other controllers from locking in on the line. The relay M39 through its armatures 62, 63 also extend the R and L telephone lines to the balancing apparatus as hereinafter referred to. The relay M40 having been energized operated to close, through its aramture 50 and through its contact 64 a holding circuit for the relay M37 and also, through its armature 65 and a contact 66, to close by way of wiper switch punching T$^2$ and the corresponding line switch punching T$^2$ the circuit of the winding of relay M2 Fig. 6. Relay M2 thus operates to clear the line for balancing purposes, its armature 24 engaging a contact 67 in order to hold the relay M1 throughout the building of the connection.

Balancing calling line.

Positive pole of battery connected to armature 68 of relay M40 Fig. 8, previously energized, proceeds by way of contact 69 and leads 70 to the winding O of relay M43, contact 71 and armature 63 of relay M39, wiper switch WS1 punching L$^0$ the corresponding line switch bank punching L$^0$ and line L, calling dial (normal position) as before, telephone 20 line R, line switch bank punching R$^0$ corresponding punching R$^0$ of wiper switch to negative pole of the battery via armature 62 of relay M39 Fig. 8, contact 72, lead 73 of an "outline ballast" RE1, and winding O1 of a relay M50 another winding 1$^1$ of which has a circuit via contact R15 and a standard line ballast R16 to positive battery. Owing to the currents in the windings 0' and 1' of relay M50 being of unequal strength, the armature 73 thereof is attracted closing a circuit via contact 74 lead 75 and contact A$^9$, the winding of a relay M46 to negative battery M46 is adapted to rotate in succession the arms of the several line ballasts referred to as RE1 to RE11, the change of drive from RE1 to RE11 and so on being due to the operation of a shift magnet M44 which at each step also causes a contact finger A$^7$ to move from one to the other of the contacts 76 shown as electrically connected to the ballast arms.

As soon as the arm of RE1, which is an "out" line ballast due to its rotation, inserts into the circuit a resistance which added to that of the calling line and telephone closely approximates that of the standard resistance R16 (which is chosen to equal or exceed the highest external line resistance intended to be dealt with) the relay M50 will release due to equal and opposite effects of its windings, thus disconnecting relay M46 which controls the ballast driving clutch and completing through armature 73 and contact 77 a circuit through the winding of the shift magnet M44, which operating changes the drive mechanism to the "in" balance RE2, moving finger A$^7$ to the second contact of 76, engaging contacts A$^8$ and A$^{10}$ and separating contacts A$^9$. Finger A$^7$ being now on the second contact of 76 connects the "in" line ballast RE2 to the winding I of the relay M43 via resistance R17, the circuit of the winding of relay M46 being now completed from lead 70 by way of the armature 78, contact 79 of relay M42 and contact 80 which one of the separated contacts A$^9$ now engages.

On the "in" line ballast connecting a resistance which added to the standard resistance R17 equals the resistance of the calling line and telephone supplemented by the "out" line ballast the currents in the windings O and I of the relay M43 will be equal and opposite in direction allowing the circuit of relay M42 to be completed at contacts 81 of M43. Relay M42 then operates to disconnect at 78, 79 the circuit of M46 and to operate shifting relay M44 via contacts A$^8$ only closed on the 2nd position of A$^7$. The balance of relay M50 is discontinued after the first movement of the shifting relay M44 by causing the latter to open at R15, the circuit of winding 1' of relay M50 leaving said relay M50 to act as a single coil relay.

*Dialing digits.*—On the subscriber operating the calling dial Figs. 6 and 6$^c$ by inserting the finger in plate 82 and rotating it until the finger stop 83 is reached, the arm 29 is turned, through the stop 28$^a$ and contact 84 around the dial studs 28$^b$. This forward operation of the plate 82 does not increase the resistance in circuit as the coils 85 are short circuited by the contact 84. On the plate 82 being released however and returning to normal position by spring 82$^a$ the contact 84 is separated from both the arm 29 and stop 28$^a$, the circuit being then via one or more of the coils 85 to the arm 29, ratchet 30 and pawl 31. A resistance corresponding to the finger hole used in plate 82 is then inserted in circuit. On the plate 82 reaching the normal position, the pawl 31 is forced away from ratchet 30 temporarily disconnecting the circuit until the arm 29 returns to normal position by the action of spring 31$^a$.

The foregoing increase of resistance unbalances relay M43 Fig. 8 thereby disconnecting at 81 the relay M42 which in turn closes at 78, 79 the circuit leading, by way of contacts A⁹, 80, to the relay M46 which rotates the arm of a record ballast RE4 (the resistance steps of which equal the resistance steps of the calling dial) until a resistance is included in the winding I of the relay M43 corresponding to that inserted in the winding O by the action of the calling dial, when, as before, the relay M42 is energized to disconnect the relay M46, the operation of the shifting relay M44 being now accomplished by the relay M50 which releases when the line circuit is broken by the return of the calling dial to normal, the circuit of the relay M44 being completed at 73, 77 as before referred to. The foregoing operations are repeated on the subsequent records RE5 etc., for the remaining digits of the wanted connection.

Recorders.

Mechanically connected to the digit record ballasts RE4, RE5, etc., are controllers RE4A, RE5A, etc., each connected set constituting a recorder. To the steps of the said controllers are connected the electrical conditions associated with the trunks or lines corresponding to the digits registered.

Engaging a line trunk.

When the control recorder engaged the calling line, a path was closed for the positive pole of battery via armature 68 of relay M40 contact 69 leads 70, 86, to winding of relay M53 through contacts 87, 88 and lead 89 to the finger 90 of wiper switch WS1 the punching T¹ of the latter to the corresponding punching T of the out section of line switch bank 1—2. A circuit was also completed from the lead 70 of the previous circuit, by way of leads 91, 92 and coil C12 to the punching W of wiper switch WS1 the lead WR1 from which (see also Fig. 6) is connected only to the sections of WS1 which are associated with the odd hundred line banks, and serves for the connection of the line trunk wipers G¹ Fig. 6 facing the bank in which is located the calling line by the operation or non-operation of the relay M5. On an idle trunk wiper G¹ sweeping over a line (the travel of the said wipers being due to the operation of drive magnet M49 Fig. 6, caused by the operation of M51 which has a circuit by way of lead ESH1A contact A10 Fig. 8, previously closed by the operation of M44, to negative battery at CSH1) having positive potential on the T punching as before shown, a circuit is completed via lead 93, Fig. 6 armature 94, lead 95, contact 96, 97 and the winding of clutch magnet M4 to negative battery, the said magnet being thus operated as well as M53 Fig. 8. M4 as previously explained with regard to Fig. 12 trips the line trunk wiper and operates the rocker arm F, breaking the contact 96—97 until the carriage returns to the bottom of the bank on the completion of the connection. The operation of M53 Fig. 8 completes at 98, 99 a circuit from lead 86 via line 100 and contacts SA to the winding of relay M54 which, operating, moves the arms associated with contacts CSF, CSH, CSG, and CSC one step and interrupts the circuit at SA thus releasing relay M54, relay M53 being held by the circuit completed through contact 87 armature 101 and coil R18 to negative battery. SB is a contact broken on the beginning of the second operation of relay M54. The contacts 55 are also operated by the first movement of relay M54. The resistance of relay M4 Fig. 6 plus that of coil 52 is arranged to be equal to that of coil 44 so that the currents affecting relay M3 balance, causing the latter to release and stop the drive mechanism, relay M39 being held by current derived from the battery at contact 101ª and conducted through one of the contacts 55 and lead 56 to the windings 57, thence to negative battery at 123. M4 by its operation changes the circuit of its windings from the T to the H punching via contacts M4B, thence via coil 52 contact 42 and winding 51, relay M3 to form a holding circuit.

Selecting 1st digit, i. e., the exchange.

A balancing circuit for selecting the first digit dialed, in this instance the wanted exchange, can be traced as follows:— Positive battery via coil X¹ Fig. 8 at RE4A, stud 2, CSC, winding 102 of relay M55 to negative battery at CSE2, this forming one side of the balance, the other side being from negative battery at CSE2, winding 103 of relay M55, L¹ punching, and finger WS1, L¹ punching and finger of line switch 1—2, thence L finger of line trunk 200, armature and contact 199 of M5 Fig. 6 contact 198 of M4B, L trunk line 184 Fig. 6ª, W finger of WS3 which on contacting with a punching having connected thereto the requisite resistance to positive battery, balances the currents in M55 Fig. 8. The rotation of WS3 and of the screw M Fig. 6ª being due to the operation of power magnet M22 due to the operation of M17 which has a circuit from negative battery via lead 150, contact 149, 215, lead 147, contact 300 of M4B to positive battery at 145. On M55 releasing due to the balancing of currents aforesaid a circuit is closed from positive battery at armature 104 via armature 105 of relay M56, one of the contacts SA which engaged contact 106 at the time they become themselves separated, and thence to relay M54 which operating connects the next digit controller, i. e., RF5A and by breaking the holding circuit R18 allows relay M53 to release, thereby sending an impulse of current over the T wire for the operation of relay M13, Fig. 6ª which is held by battery at 145 thus extending the circuit to the bank wipers facing the bank of trunks leading to the wanted exchange on the out trunk switch 12, relay M53 Fig. 8 being again held by R18.

*Selecting 2nd digit, i. e., primary trunk group.*

Positive or negative battery at RE5A via stud 3 at CSD winding 107 of relay M56 and from the junction of said winding 107 with winding 108, via stud 3 at CSF to positive or negative battery at RE5B the circuit of winding 108 of relay M56 being via stud 3 at CSG to punchings R1 of wiper and line switches, thence via R line of line trunk to finger R of wiper switch No. 3 Fig. 6ª associated with the out trunk switch 12, thence via the bank wiper finger which meeting a polarity and resistance at the armature 109 of relay M15, corresponding to the polarity and resistance as set up on RF5A causes the relay M56 Fig. 8 to be balanced, the trip current in this case operating relay M14 Fig. 6ª thus arresting the travel of wiper screw M and extending the connection to a trunk to the 5,000 line group in which is located the wanted line, a circuit is now closed at contacts 132 Fig. 8 sending positive current over the T wire to the armature 110 of relay M15 at the "out" trunk switch 12 Fig. 6ª thereby operating relay M16 and cutting Ret A out of circuit whilst transferring the records, and completing a loop circuit to the control repeater, the relay M15 being operated by current from the holding battery at 112. The ultimate purpose of Ret A is to furnish a path for the holding of connecting trunks from the incoming switch onwards.

*Control repeater.*

The next operation is the engaging of a control repeater which takes the records of unselected digits from the control recorder and completes the building of the connection. The circuit is now from battery at contact 4, CSC Fig. 8 winding 102, 103 of relay M55 lead 104. L¹ punching of wiper switch WS1 along L trunk line, as far as previously completed and thence to contact 113 Fig. 7ª to winding of relay M19 returning via R trunk line to negative battery at CSG4 Fig. 8 relay M19 Fig. 7ª operating closes the circuit of winding 114 of relay M21 to T¹ punching on repeater section Fig. 9 thereby designating to the repeater wipers the trunk calling. Positive battery at CR1 to winding 115 of relay M21 this current operating relay M21, which in turn closes the circuit CR3 and relay M23, the latter operating completes a circuit for drive magnet M28 Fig. 7ª to rotate WS4 Fig. 9, WS5 Fig. 7ª and screws M Fig. 9ª of disengaged control repeaters by the action of armature 147 Fig. 7ª closing a circuit by way of CR3 to M23 which operating armature 148 serves to close a circuit for M28 clutch magnet to operate the drive mechanism aforesaid.

On wiper finger T¹ RS6 making contact with a punching having thereon positive battery derived from winding 114 of M21 by way of armature 149 of M19 Fig. 7ª T¹ punching of RS6 Fig. 9ª and T¹ punching and finger of WS4 Fig. 9 (WS4 Fig. 9 being arrested in the contacts leading to the bank section in which the calling trunk is located by the operation of M60, trip magnet, which has a circuit by way of 152, W finger WS4, CR2, 153 of M21 Fig. 7ª to positive battery) a circuit is closed to negative battery via contact 61ª and winding of M61, M61 operating closes a circuit via armature 152 for the operation of M59, trip magnet, associated with screws M as follows, lead 305, 152 of M61, lead 303, H finger RS6, Fig. 7ª, to battery 304 by way of M20 and 154. M61 further completes a holding circuit for M60 by way of 152, lead 303, Fig. 9, H punching WS4, H, RS6, Fig. 7ª M20 and 154 to battery 304. A circuit is also completed by the operation of M61 Fig. 9 for the battery on the 4th point of CSC, Fig. 8, both windings M55, L side of trunk, 184 Fig. 6ª, L contact M12, L, WS3, L bank punching, contact 113 of M16: L of 13 trunk line, L of RS6, Fig. 7ª and 9ª, L° of WS4 Fig. 9, L of M61, L winding M62, contact SF, contact B, M65, R contact M61 returning to negative battery at CSG4 Fig. 8 by way of R contact M61, R° of WS4, R°, RS6, Fig. 9ª and 7ª R of trunk 13 Fig. 6ª 113, R of M16, R of bank switch 12, R, WS3. R, M12, 182, R of M5 Fig. 6 to CSG4 Fig. 8 as previously detailed.

Figure 9:
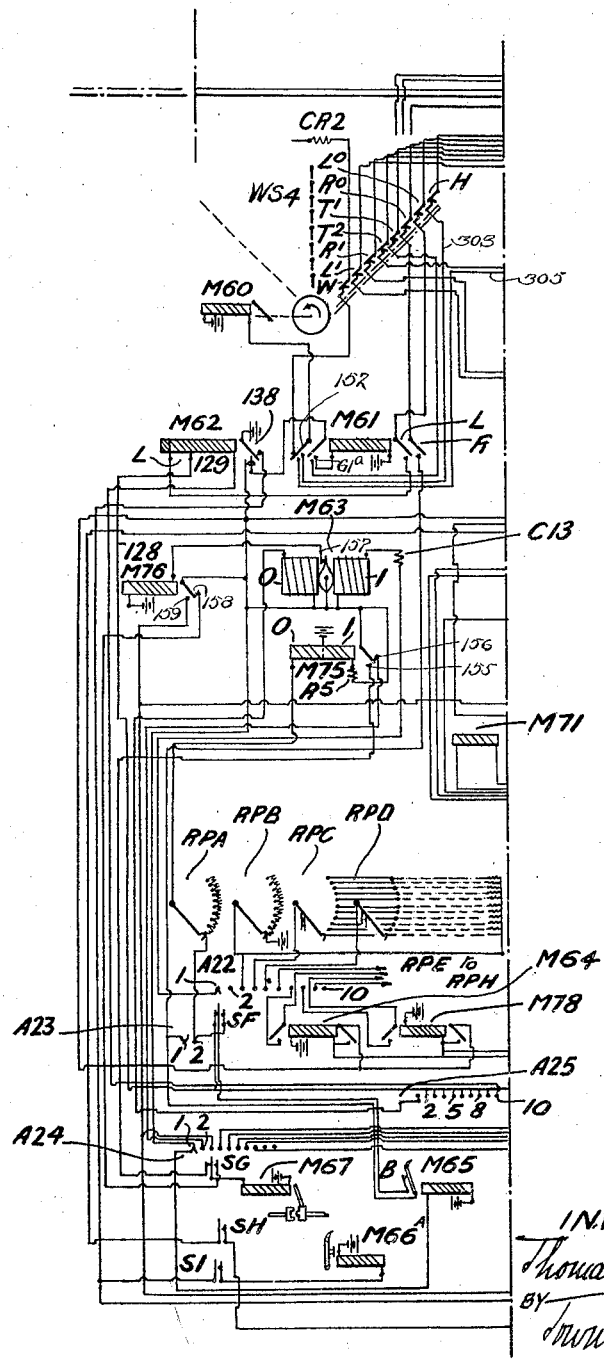

M62 operating closes a holding circuit for M61 via battery at 138, Fig. 9 and also separates M65 via A24. M65 operating in turn breaks the contact B allowing M55, Fig. 8 to release, to operate shift magnet M54 thereby moving the contact arms CSC, etc., to the 5th position. M65, shift magnet, Fig. 9 also moves the arms A22 to 25 one step and operates contacts SF, SH and SI. A23 closes the circuit of O winding M75, Fig. 9 and RPA, out trunk ballast, R, M61, the connection previously established to winding M55 Fig. 8 returning via the L side of the trunk, L, M61, Fig. 9, L winding M62, 2nd contact A25 and O winding M63 to battery at 138. The I winding M75 has a circuit via R5, standard trunk ballast, (the resistance of which equals that of the longest trunk line to be dealt with plus the resistance of relays M55 and M62) to battery at 128.

As the current in the O winding M75 will be in excess of that in the I winding contact 155 will be closed to operate rotary magnet M67 via contact SG, resulting in the arm RPA inserting a resistance to approximately balance the currents in M75, thereby breaking the contact 155 and closing 156 and completes the circuit A 24, 2, and M65 which latter operating changes the rotary drive from RPA to RPB and moves the arms A22 to A25 one step and also operates contact SG thereby transferring the rotary control of arms RPA, etc., from M75 to M76. During this operation of M65 contact B does not break the loop circuit of the trunk and of M55, due to the shunt placed around contact B by A23.

The final balancing is now by way of M63 and RPB which on the latter inserting sufficient resistance to balance the currents in the O and I windings of M63 closes contact 157 to energize M76 which in turn disconnects the rotary magnet M67 at 158 and closes the circuit of shift magnet M65 at 159 and A243. M65 operating disconnects at B the loop circuit of M55 Fig. 8 which releasing again operates M54 moving the arms CSC, etc., one step thus connecting in the aforesaid loop circuit the resistance recorded in the next digit recorder, that is to say RE6A when the same operation of balancing is repeated by the insertion of resistance RPC and so on for the remainder of the digit records to be transferred. M62 being a slow release type relay remains operated throughout the foregoing operations.

Relay M64 on main exchange calls and relay M78, Fig. 9 on branch exchange calls delay the transfer of the final records by holding the circuits of RPF on main exchange and RPG on branch exchange calls open until RSH reaches the 3rd and 7th position respectively, when trunks to the line switch 1—2 of the wanted subscriber are obtained, in order that a time limit may be introduced for connection to the wanted line, failing which, due to the wanted line being busy, a busy signal will be given by the action of relay M57 Fig. 8 to the calling line, hereinafter fully detailed.

*Selecting of 3rd digit, i. e., the secondary trunk group.*

RPCA, RPDA, etc., being mechanically connected to RPC, RPD, etc., will have taken up corresponding positions to those of RE6A, RE7A, Fig. 8. Then positive battery at RPCA, Fig. 9ª via coil $x$, RSC1, contact 4BE switch, winding 115 of relay M72 to the negative battery at RSF1, by way of switch BE No. 5 then winding 116 of relay M72 via contact SH, L of relay M68, $L^1$ WS4 Fig. 9, $L^1$ control repeater section Fig. 7ª to relay M26, WS5 thence to positive battery on coil X10, thereby balancing currents in windings 115, 116 of relay M72 Fig. 9ª which releasing closes contact 117 giving a circuit from battery A29 (closed by the operation of RPC) via RSA1 to winding of relay M66, which operating moves the arms RSA to RSG one step, and breaks holding circuit R7 of relay M69 sending a tripping impulse to relay M26 Fig. 7ª arresting the rotation of WS5, said rotation being due as aforesaid to the closing of contact 147 to operate M23, which in turn operates M28 clutch magnet, relay M69 Fig. 9ª being previously operated on the energizing of relay M62 via RGS1 which is now broken by the first operation of relay M66.

*Selecting of 4th digit, i. e., primary line group.*

Positive or negative or earth potential at RPDA, Fig. 9ª, 2nd position RSD and winding 118 of relay M73 to positive or negative battery at RPDD via BE switch No. 6 and RSF2, then winding 119 of relay M73 via BE switch No. 7, R of relay M68 R1 of RS6, R of relay M25 Fig. 7ª to R wiper finger on incoming trunk switch bank 14 thence R contact M31 Fig. 7 to positive, negative or earth potential at coil X15. Also negative battery via coil X20 at RPDB, Fig. 9ª on a call to an odd hundred line or zero potential on a call to an even hundred line, thence RSC2 winding 115 of relay M72 centre of which to positive or negative battery at RPDC, then winding 116 of relay M72, L of M68, $L^1$ of RS6, L of M25 Fig. 7ª to L finger on bank 14 thence L of M31, to relay M33 Fig. 7 operating this relay on a call to an odd hundred line. On relays M72 and M73 balancing the trip current operates relay M27 Fig. 7ª to arrest the wiper travel. The holding battery 178 at relay M27 operating relay M31 Fig. 7 and holding relay M33 (if previously operated).

*Selecting the 5th and 6th digits, i. e., the wanted line.*

The 5th and 6th digits, tens and units are selected in one operation, 5th digit, positive or negative or potential at RPEB via RSC3 to winding 115 of relay M72 the centre of which via RSE3 to positive or negative battery at RPED. Then the winding 116 of relay M72 to L wiper finger of the incoming trunk Fig. 7, 6th digit. Positive or negative or earth potential at RPEC Fig. 9ª via units resistance $X^{21}$ to $X^3O$ at RPFB, RSD3 to winding 118 of relay M73, the centre of which via RSF3 to positive or negative battery to RPEE, then winding 119 of relay M73 to R wiper of incoming trunk Fig. 7 via L and R of M33.

Then on L and R wiper fingers 120 Fig. 7 of the incoming trunk making contact with L and R punchings having connected thereto, via the back contacts of relay M1A, the same condition as connected to windings 115 and 118 of relays M72 and M73 (Fig. 9a) both relays will balance (the travel of the wipers being due to battery from (178) operating M35 via H punching, M35 in turn operating clutch magnet M48) with the trip current operating relay M32 Fig. 7 arresting the wiper fingers on the wanted line and extending the T circuit by way of 171—172, which circuit has a positive potential placed thereon at RSB4, Fig. 9a, by way of T2 and the connection so far built up to the winding of relay M2A, Fig. 7, of the wanted line. Relay M32, being held by the circuit of C2A via relay M1A giving the back release feature, M1A being operated by the contact 67 of M2A.

Figure 6A:
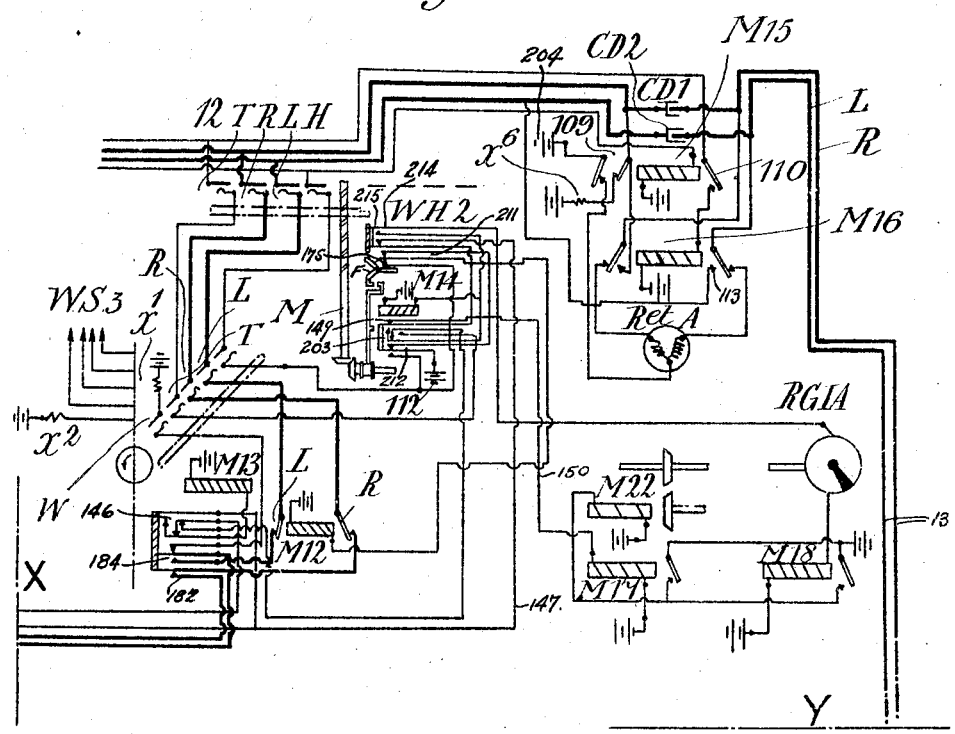
Figure 6C:
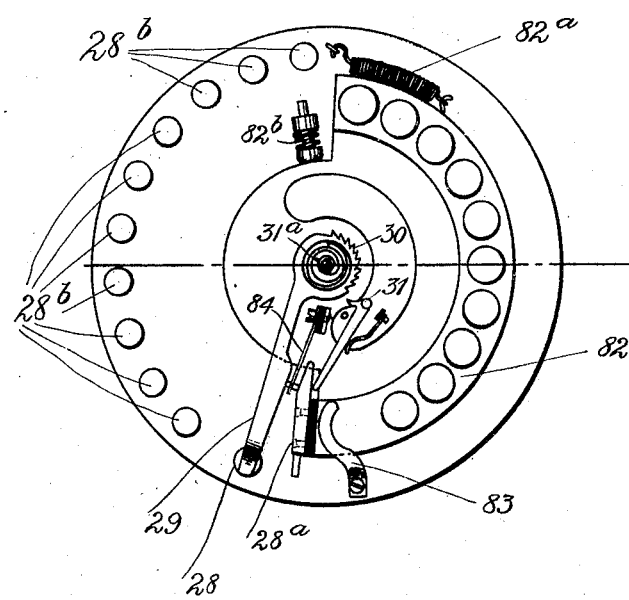
Figure 6D:
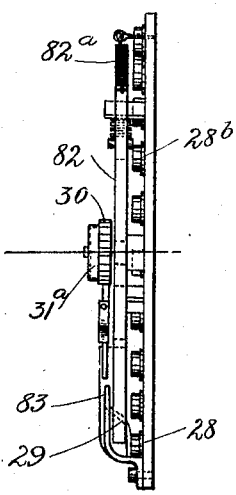

In the event of the wanted line, or of the trunks previously utilized being already engaged, relays M12, Fig. 6a, M25 Fig. 7a and M29 Fig. 7 would have found a positive potential on the H punchings of the respective banks. In Fig. 7 this potential is derived from battery at M3A, via C2A and 174, in Fig. 6a from battery 112 of engaged wiper by way of 175 and in Fig. 7a from battery 178 of engaged wiper by way of 176 and 177. The aforesaid relays being operated disconnect the R and L lines thus preventing a balance being obtained and interference with established connections.

As shown the operation of trip relays M4, M14 and M32 by closing the circuits of battery shown at 112/178 put a busy indication on the H punchings on which their respective wipers are resting. In Fig. 7 this is accomplished by M1A closing a circuit for battery at M3A.

Branch exchange calls.

In the event of a call to a branch exchange, on a trip being given for the 4th digit, moving the arms RSA to RSJ Fig. 9a to the 3rd position and connecting the control circuit to the bank wiper of the incoming trunk switch 14. Should the T wiper finger now find positive battery on the T punchings in lieu of negative battery as found on main exchange calls as heretofore described, indicating that the call is to a branch exchange, relay M71 Fig. 9a would have operated moving contacts 1 to 8 of switch BE to the inner position connecting records RPFA, RPGA, and RPHA via RSJ to the branch control repeater connected at 121 to the "in" branch trunk switch 17 Fig. 4, where the transfer of records and the completion of the connection would be accomplished as described from the control recorder to the control repeater.

Progressing of surplus digits.

Reverting to the previous explanation of a main exchange connection with the arms RSA to RSJ of the control repeater Fig. 9a in the fourth position, and the arms CSC to CSG Fig. 8 in the 9th position. The last digit recorded, that is to say 6th digit on being transferred to the control repeater operated the arms CSC to CSG to the 10th position, the record in connection with which, i. e., RE1C and succeeding records are in the normal position. Therefore no extraneous resistance is connected in the trunk circuit affecting the balance of relay M63 Fig. 9. Relay M76 is therefore operated and the relay M65 will automatically operate and release until arms A22 to A25 reach the 10th position carrying arms CSC—CSG Fig. 8 to the 12th position where relay M57 is energized via contact CSH12, starting travel of arm 122 of relay M57 and breaking contact 123, thereby changing the holding circuit of relays M39, M40, etc., to the bar 124 of relay M57, which within a predetermined period will automatically disconnect the holding circuit of M39 from battery at CSH11, arm 124, of M57, and arm 137 of M41 this operation releasing the control recorder from circuit which in turn by disconnecting the battery at 69 of M40 by way of M53, contact 132, T¹ of WS1, T¹ of L8—1—2 to winding M16, via 110 of M15 Fig. 6, thus disconnecting the control repeater as hereinafter detailed. On the control recorder disengaging, the circuit to M2 is broken, thereby placing M1 directly on the calling line, which on the receiver being restored releases the trunks by the breaking of armature 42, giving a busy signal before so doing via TF1 and 182.

Should the subscriber restore his telephone before obtaining his connection through failure of dialing or other reasons a circuit is completed for the operation of slow relay M41 via 77 of M50 to battery at 68, M40 to disconnect the contact bar 137 as before. Should the full dialing not be fulfilled and the receiver not be restored a circuit via 68, 69 of M40 to relay M45 completed on the engagement of the control recorder will operate relay M45 in a given time to close alarm lamp AL, to draw the attendant's attention. The foregoing automatic operation and release of M65 Fig. 9 is prevented from taking place, in the case of main exchange calls until the arm A25 reaches the 8th position as contacts A30a to A30e Fig. 9a are only closed on the off normal position of RPC, RPD, etc., A30a being operated by RPC, A30B by RPD, A30C—A30E being operated in like manner. A30E is further shunted on a call to a party line. On branch exchange calls this shunt is removed by the operation of BE1—RPG, in this case representing the last or unit digit.

Ringing called subscriber.

Ringing current from F¹ to F⁴ (party line ringing) via RPGB (party selector) Fig. 9ªL, relay M68 (operated via interrupter 125 and RGS², the latter having operated on the 4th operation of relay M66 and rear contact of BE switch No. 8) called subscriber's line and instrument (relay M2A of the called line being operated via battery over the T circuit via RSB4 and BE switch No. 8) returning via R line to F¹—F⁴. On relay M68 restoring due to the action of 125, positive battery RSC4 via windings 115, 116 of relay M72 to line, thence, on called subscriber answering returning to negative battery at RSD4. Relay M72 operating, closes positive battery circuit at RSH4, BE switch No 4, contact 127, A25, lead 128 Fig. 9 to L winding of relay M62 (M62 being held during the ringing period by winding 129 and A25¹⁰ the resistance of the winding 129 being sufficiently high to prevent the operation of relay M55 Fig. 8) thence via L side of trunk line of windings 102 and 103 of relay M55, CSC¹² and CSG¹², R trunk line to negative battery at relay M75 Fig. 9, closing a circuit for relay M54 Fig. 8 via SC (closed on the 12th position of CSG, etc.) and SA. Relay M54 operating moves arms CSC, CSG to the 13th position.

Registering the call on calling subscriber's meter.

Positive battery at contact 69 of relay M40 Fig. 8 via relay M53, contact 133, closed on the 13th position of arms CSC, etc., contact 130 of relay M55 to negative battery at contact 131 of relay M58. M58 acting and releasing until a holding circuit is found via contacts 134 and RE4B, which also gives an operating circuit to relay M56 via CSD13 and CSF13. M56 by operating breaks contact 135, releasing control recorder, the subscriber's line meter M48 Fig. 7 being successively operated by each attraction of relay M58 Fig. 8 by the battery at 136 and M wiper finger of WS No. 1. Contact 135 of relay M56 by breaking the holding battery via 137 of relay M41, releases M39 and M40, etc., disconnecting the circuit. Battery at 68 of relay M40 then having a circuit to relays M47 and M51 via contacts 138 and 139 which were closed on the first operation of relay M54. Relays M47 and 51 by operating withdraw the holding pawls of all the records and arms hereinbefore mentioned in the control recorder.

Releasing the control repeater.

As previously shown, the battery to relay M16 from relay M40 is now disconnected allowing relay M16 to release thereby inserting condensers CD1 and CD2 Fig. 6ª into the trunk circuit and connecting Ret A, the positive battery on the centre of which from relay M15 opposes that flowing in coil L of relay M62 (Fig. 9) thereby releasing this relay to disconnect the control repeater via contact 138, S1 and SJ to relay M66ª and M77 respectively which by releasing their pawls return the repeater apparatus to normal.

Holding of connection by subscriber.

On the control recorder disengaging, the battery to relay M2 Fig. 6 of the calling subscriber was disconnected thereby replacing windings of relay M1 on the calling subscriber's line and so governing relay M4 which controls the holding battery of the trunks less relay M32 Fig. 7 which is under the control of the called line.

Time limit of connection.

Relay M30, which may be of any known delay action type, such as a solenoid, dash pot combination, is arranged to disconnect the connection at the expiration of a predetermined period.

The operation being as follows: positive battery 178 Fig. 7ª by way of WS5, H punching of switch 14 to negative battery via winding 139 of M30 Fig. 7.

On the plunger of M30 operating a given distance 141 is closed connecting battery through the high speed interrupter to L side of the trunk to give a warning tone. On the further operation of the plunger 308 is disconnected from the battery 142, thereby releasing M31 to terminate the connection.

M30 does not commence operating until the establishment of talking conditions, due to winding 140, which has a circuit from battery at BE8 Fig. 9ª RSB 8—9, T² punchings RS6, along the T circuit previously established to negative battery at M30 Fig. 7 opposing the effect of winding 139. On the control repeater disengaging from the circuit winding 140 is inoperative due to the battery at BE8, Fig. 9ª being disconnected.

Talking connection.

The through talking connection now established is as follows:—calling telephone 20, Fig. 6, R line lead 34, 35, contact 36, R bank punching switch 1—2, finger 180 R of M5, 182 Fig. 6ª, R of M12 R of WS3, R finger and bank punching, switch 12, CD1, R of trunk 13, CD3 Fig. 7ª, RM25, RWS5, R finger and punching switch 14, R of M31, Fig. 7, R of M29, R of M33, R finger and punching of called line switch 1—2, R of M1A to called telephone, returning by L line, L of M1A, L punching and wiper finger switch 1—2, Fig. 7, L M33, L of M29, L of M31, L punching and wiper finger switch 14, Fig. 7ª, L of WS5, L of M25, 162, CD4, L of trunk 13, CD² Fig. 6ª L punching and wiper finger switch 12, Fig.

6ª, LWS3, L of M12, 184, 198 Fig 6, L of M5, L finger and punching of switch 1—2, 25 of M2, lead 26—27 and L line to calling telephone. The current bridges for the calling line being M¹ and for the called line M¹ª.

*Releasing connection.*

On the calling subscriber replacing the receiver the circuit from battery 21 Fig. 6, is disconnected at the switch hook 20, causing M1 to release thereby disconnecting at 42 the circuit of trip relay M4 via coil 52. M4 releasing disconnects battery 145 thereby releasing M5, if previously operated, and also M13, Fig. 6ª via 146 and further releasing M14 via lead 147, and contact 148 and 203. M14 releasing disconnects battery shown at 112 from H punching of switch 12 thereby releasing M15 to disconnect battery 204 from trunk 13 by way of Ret A, this battery during the connection having a circuit over both sides of trunk 13 in parallel, contact 113 Fig. 7ª and lead 205, both windings (in opposition) M19, centre of which via contact 206 and winding M74 to negative battery, operating M74 to furnish holding battery 207 to switch 14, the foregoing circuit now being disconnected. M74 is released thereby disconnecting battery 207 to release the holding circuit at 208 of M26 and of M27 at 209, M27 releasing disconnects the battery 178 from the H punching of switch 14 thereby releasing M31 Fig. 7, and M33, if previously operated, the release of M32 is accomplished by the restoration of the receiver on the called telephone, by disconnecting the loop circuit of battery, through windings of M1A, which releasing 173 breaks the circuit from M3A by way of C2A, H punching switch 1—2, H of M33, 174, and winding M32, this releasing the final switch.

On the release of the aforesaid trip relays, that is to say M4, Fig. 6, M14 Fig. 6ª, M27 Fig. 7ª and M32, Fig. 7. The respective screws M, associated with the said relays will be rotated until the wiper carriages reach top and then the bottom of their respective banks. The wiper during this movement being out of relative position with respect to other wipers have their circuit disconnected by the operation of relays M12 Fig. 6ª, M25 Fig. 7ª and M29 Fig. 7 due to the circuit closed at 211, (previously closed by the operation of rocker F under the action of the said trip relays and held by a lock joint) and contact 149, 212 closed by the release of the trip relays. Thus closing the circuits of batteries 112, 178 and 213 respectively. for the operation of relays M12, M25 and M29.

On the wiper carriages reaching bottom position the rocker arm F is restored breaking contact 211 to release the aforesaid relays M12, M25 and M29 at the same time contacts 214 are closed and contacts 215 broken. 214 serves to connect the regulators RG1A, RG1B and RG1C to the respective trip relays M4, M14, M27 and M32. The battery for the operation of the said trip relays being obtained by way of relays M51, Fig. 6, M18, Fig. 6ª, M24 Fig. 7ª and M34 Fig 7 which relays on operating, due to the circuit by way of their associated regulators RG1, etc., contact 214 and the aforementioned trip relays, close a circuit for the operation of clutch magnets M49, Fig. 6, M22 Fig. 6ª, M28 Fig. 7ª and M48 Fig. 7 thereby clutching the driving gear to rotate the screws on the respective switches until the detained wiper carriages are brought into proper relative position when the insulating segment on the regulators RG1, etc., passes under the brush associated with the carriage being held at bottom position, when the various relays are released leaving the carriage free to travel on the next rotation of the screws on succeeding calls. The same apparatus performs the functions of a semi-automatic system if the control recorder wipers Fig. 8 be connected to an operator's circuit in which are incorporated the necessary records RF4A, etc.

Fig. 8ª shows the circuit shown in Fig. 8 adapted to function on a semi-automatic system. On the control recorder contacting with a calling line, relays M39 and M40 are operated as hereinbefore explained M39 Fig. 8ª now serves to extend the L° and R° leads to a switching key 400 and to a battery feed relay M401, which operating armature 402 closes the circuit for call lamp 405 via CSH1. On actuating key 400 the L° and R° leads are extended to operator's telephone 403 by way of 404. On the operator receiving the particulars of the wanted connection, keys 406 are set in accordance with the call of the wanted line thereby setting the records RE4A, etc. The operation of selecting the trunks and wanted line being as before explained. M139 (holding relay) retaining the keys 406 in their operated positions until the control recorder disengages. 407 is an emergency key to release the records, if wrongly set up A10 by its operation previously explained disconnects the calling lamp 405 and connects in sequence the several supervisory lamps 408 which show the progress of the building up of the connection.

It will be seen that when used on a semi-automatic system the apparatus used for balancing the calling line is not required, that is to say, the instrument dial, Fig. 6 and 6ª also M42. M43, M44, M45, M46, M47, M50, RE1-11, R15, R16, R17 and A7-8-9, all shown in Fig. 8.

The invention further contemplates the employment of a type of trunk or connecting circuit common to several groups of lines or trunks and adapted to permit of the selection of any group associated with the said group trunk, by means of relay or other switching means using a portion of the trunk for such connection and leaving the remaining section or sections of the said trunk available for dealing with calls between other groups associated with the trunk in question. This feature of the invention will now be described with reference to Figs. 19 to 23ª.

Referring first to Fig. 19, 150 is a line switch on which the subscribers' lines terminate. Sweeping over the bank punchings of the said lines are a number of travelling members some of which are employed for the purpose of extending a call from the lines terminating on such switch, towards the wanted line, some for dealing with incoming calls, and some for connection to control recorders which control the building of the required connection, all as already described. In Fig. 21, 151 represents one of eight "out" trunk switches distributed at positions such as A B C D E F G H in Fig. 19 each of which is adapted to be connected to a group trunk 152 according to the invention, I and J Fig. 21 representing two spare points for other connections that may be desired, the remainder of the elements in said figure the same as those of Fig. 5.

The out trunk switches 151 Fig. 19 represent two sets of main area groups, four of such groups being contained in each set. The first four groups namely A to D are termed "positive" groups and the remaining four groups E to H are termed "negative" groups. The subscribers on a main exchange of 20,000 lines capacity are also divided into four groups and are so associated, for outgoing calls, with the foregoing main area groups that the calls are averaged over the composite sections of the group trunk 152. For example, a subscriber in the first 5,000 lines of an A group exchange would have, in the positive group his own group A as the 1st right group, with B as the 2nd right group, whilst D would be the 1st left group and C the 2nd left group. In the negative set E and F are the 1st and 2nd right groups while H and G are the 1st and 2nd left groups respectively. The positive and negative sets are selected by the polarity applied, by a control recorder, on a given wire. The right and left groups are selected by the right or left side of the trunk and the 1st and 2nd groups by the polarity applied to the said trunk.

Referring now to Fig. 22, which shows a portion of the line switch 150, the first digit recorded on the control recorder, connected at 153 Fig. 19 by the action of the calling dial and which corresponds to the main area group in which is located the wanted line would have set the control arms RE3A to RE3E in a given position. The circuit will then be say from the positive or negative battery at RE3C via CS3 and $T^1$ of wiper switch 154 corresponding bank punching of the line switch to the finger T Fig. 23 of a passing group trunk wiper on the out section of the line switch thence by lead 155 to the associated armature of relay M5 Fig. 23 and lead 156 to the windings of polar relay M49, the circuit being continued by lead 157 to earth at 158. Relay M49 then acts to close either contact G or $G^1$, in accordance with the polarity, in order to operate either relay $M^6$ of the positive or negative group. Current from the positive or negative battery at the balance coils RE3A or RE3B Fig. 22 will then flow via CSC or CSD to the windings B1 of either of relays M55 or M56 the other end of which is connected via CSE or CSF to opposite polarity at RE3F or RE3D. The circuit of each winding $B^1$ is also continued via the corresponding winding $A^1$ of relay M55 or M56 to the punchings $L^1$ $R^1$ or wiper switch 154 to the group trunk wipers.

Assuming the call to be to the 1st right group, then positive potential would exist at the centre of the windings $A^1$ $B^1$ of relay M56 the circuit of the $B^1$ winding being completed to the negative pole of the battery at RE3B. The circuit of the winding $A^1$ of relay M56 would be to punching $R^1$ of wiper switch 154, group trunk finger R and lead 159, through the associated armatures of relays M5, M6, Fig. 23 which latter as explained is now energized, armature 160 of relay M9 lead 161 to winding $A^2$ of relay M7 lead 162 to winding $A^3$ of relay M10 thence via coil E1 to earth at E, causing the armature 163 of relay M10 to act to the left, thereby connecting the negative pole of battery X to circuit R via wiper switch at $R^1$ to balance the currents in the windings A1 B1 of relay M56 Fig. 22. The foregoing also allows sufficient current to flow in the winding $A^2$ of relay $M^7$ to operate such relay wherby the circuits L, R, T and H are extended over the back contacts of relay $M^8$ to the "out" trunk switch 151 of the first right group.

On the relay M56 Fig. 22 releasing, due to the balancing of the currents in the windings $A^1$ $B^1$, a circuit is completed from battery at A12, Fig. 22, via the armature of relay M55 (not having operated on account of its windings being disconnected) to the winding of shift magnet M54, which, operating, moves the arms at CSB to CSG one step thereby substituting the records for the succeeding digit. Further, upon magnet M54 operating as just mentioned, the contacts at CS1, CS3 and CS4 are mechanically moved, contacts CSB and CS1 sending a trip current from battery at 164 through winding of relay M53 to the H wire and wiper switch finger H on the trunk group. This current is only momentary due to CSB breaking, when the relay M53 is held by CS4 and R10 which in turn is broken on the commencement of the second trip. The foregoing trip current has a circuit via wiper finger H and lead 165 through the associated armature of relays M5 and M6 Fig. 23 which latter is still energized, and leads 166, 167 to the winding of relay M4 which, operating, arrests the travel of the wiper of the line switch, and completes, from holding battery H¹ B¹, a circuit by way of leads 168, 169 and armature H, B of relay M6 to winding of M9 relay M9 causing the latter to operate and establish a holding circuit for the relay M5, if previously operated, relays M6, M7 and M10 and also by operating relay M17 of the out trunk switch 151 to start the travel of wiper on such switch. The operation of the relay M4 also interrupts the circuit of relay M49 and of relay M5 to the wiper switches of the control recorder, the circuit of relay M4 being now held via the subscriber's line relay.

If the trunk 152 Fig. 19 is already engaged, the foregoing balances, which resulted in the operation of M4 would not have been obtained, resulting in the drive mechanism continuing to operate, thereby driving all the free wipers of the other group trunks, similar to and feeding the same groups as trunk 6, in progression over the line switch punching until a wiper having the requisite electrical conditions available contacted with the calling circuit when the aforesaid balance conditions would be obtained.

The prevention of balancing conditions on engaged trunks is accomplished, in the case of the existing connections originating from the same line switch as that in which the line now seeking a connection, by M4 being in an operated position, thus preventing the wiper arms from traveling.

In the case of the trunk 6 being engaged in the left section, but free in the section in which the calling line is located, M10 of the engaged section would be in the operated position thereby disconnecting the balance circuit at E3 and in the case of the right section being engaged M9 of that section would be in the operated position, thereby cutting the balance circuit at O¹ as heretofore explained.

Had the call been for the 2nd right group, negative battery would have been connected to the centre of the windings A¹ B¹ of relay M56 Fig. 22 with the B¹ winding connected to positive battery. On negative current reaching the winding A¹ of relay M10 Fig. 23 this relay would operate to the right placing windings A³ and S in parallel and extending the circuit via winding A⁵ of relay M8 to wire O at P1A, relay M10, as before, cutting the circuit of relay M11.

As P1A is connected to P1B of the adjacent group, in this case group B, the circuit will proceed via line O, P1B, and O¹ at relay M9, L armature of relay M6 armature 160 of relay M9, lead 161, winding A² of relay M⁷ to relay M10 as before with, since the 2nd group is being dealt with, positive battery at X. Relays M⁷ and M8 being both operated extend the trunk to the 2nd right section.

What I claim is:—

1. In a telephone system, the combination of a number of power driven switching mechanisms, a number of contacts to which the said switching mechanisms have access, trunks and lines associated with said contacts, means whereby the several trunks and lines have associated therewith a predetermined electrical condition, individual to the said trunks and lines, a number of control recorders adapted to engage a line when calling, calling means adapted to operate the control recorder to establish similar electrical conditions as are associated with the required connection, trip mechanisms adapted to arrest the movement of the power-driven switching mechanisms, and a balancing circuit which on a switch mechanism meeting an electrical condition similar to the electrical condition established on the control recorder, will cause a trip current to flow for the operation of the aforesaid trip mechanism.

2. In a telephone system, the combination of a number of power driven switching mechanisms, a number of contacts to which the said switching mechanisms have access, trunks and lines associated with the said contacts, means whereby the said trunks and lines have associated therewith a predetermined resistance and polarity, individual to the said trunks and lines, a number of control recorders adapted to engage lines on their assuming the calling condition, means adapted to operate the control recorders to establish similar resistances and polarities as are associated with the required connection, trip mechanisms adapted to arrest the movement of the power driven switching mechanism and balancing relays, which when equal currents of like polarity flow in their opposing windings, will release to operate the aforesaid trip mechanisms.

3. In a telephone system, the combination of a number of power driven switching mechanisms, a plurality of contacts to which the said switching mechanisms have access, trunks and lines associated with the said contacts, means whereby the several trunks and lines have associated therewith a predetermined electrical condition individual to the said trunks and lines, a number of control recorders adapted to engage lines on their assuming the calling condition, selecting means such as a calling dial whereby the control recorders are operated by the selecting means which serves to add an additional extraneous resistance to that of the normal resistance of the associated line, means whereby the control recorder, temporarily associated with the calling line, will firstly balance the resistance of the calling line, adding such additional resistance necessary to bring the total resistance to a given standard, and secondly, to successively balance the additional resistance added by the calling dial for the several digits of the required connection and trip mechanisms adapted to arrest the travel of the seeking switches on the balancing relays releasing on a balance being found.

4. In a telephone system the combination of a number of power driven switching mechanisms, a plurality of contacts, trunks and lines associated with the said contacts, means whereby the said trunks and lines have associated therewith a predetermined electrical condition, individual to the said trunks and lines, a number of control recorders adapted to temporarily engage lines on their assuming a calling condition, a selecting means whereby the control recorders are set in a given position by the operation of the said selecting means; a balancing circuit, having connected thereto in a given sequence a given resistance and polarity as set up by the control recorder and means whereby, on the seeking power driven switches making connection with contacts having connected thereto a similar resistance and polarity a balance will be obtained to arrest the travel of the seeking member by means of a trip mechanism.

5. In a telephone system, the combination of a number of switch mechanisms operated by vertical open ended screws adapted to be driven by a main or subsidiary power drive and engaged thereto by the action of a trip mechanism, a plurality of contacts, lines, associated with the said contacts, means whereby a predetermined electrical condition is established, individual to the said lines, a number of control recorders, adapted to engage the lines on their assuming the calling condition, calling means adapted to operate the control recorders in accordance with the digits dialed, and a balancing arrangement adapted to operate a trip mechanism on the seeking member finding a contact having the requisite electrical conditions.

6. In a telephone system, the combination of a number of switch mechanisms operated by vertical open ended screws adapted to be driven by a main or subsidiary power drive and engaged thereto by the action of a trip mechanism, a plurality of contacts, trunks associated with the said contacts, means whereby a predetermined electrical condition is established individual to the said trunks, and means adapted to operate a trip mechanism on the seeking member finding a contact having the requisite electrical conditions.

7. In a telephone system, the combination of a power driven switch mechanism embodying a brush carriage, operated by a power-driven open-ended screw, travelling vertically over a bank of contacts, on its upward travel only, and adapted to be tilted, on the completion of its upward travel, to dis-engage from the contacts and from its operating means so that it can return by gravity force to the bottom of the bank where it is re-engaged by the said screw and a trip mechanism arranged to release the power-driven screw from its drive source on the brush fingers engaging the contacts sought for.

8. In a telephone system, a combination of power driven brush carriages adapted when disengaged and in normal position, to travel in a vertical direction over the face of a vertical bank and so controlled that they are spaced equi-distant in a vertical plane that no two carriages are in the same horizontal plane, a spacing regulator arranged to release the brush carriages from the bottom of the contact bank in their proper sequence, so that no two carriages are travelling in the same horizontal plane.

9. In a telephone system, the combination of power-driven switch mechanisms, comprising carriages and brush fingers, a plurality of contacts, lines associated with the said contacts, a trip rocker mechanism adapted to disconnect the circuits of the brush fingers, when the brush is travelling out of relative position in relation to other carriages, as for instance, on the completion of a connection and a trip mechanism adapted to arrest the travel of the switch mechanism during the connection, and to release same on the termination of the connection.

10. In a telephone system, the combination of power-driven switch mechanisms, comprising carriages and brush fingers, a plurality of contacts, trunks associated with the said contacts, a trip rocker mechanism adapted to disconnect the circuits of the brush fingers, when the brush is travelling out of relative position in relation to other carriages, as for instance, on the completion of a connection and a trip mechanism adapted to arrest the travel of the switch mechanism during the connection, and to release same on the termination of the connection.

11. In a telephone system, the combination of a number of power-driven mechanisms comprising a number of open-ended screws driving a number of brush carriages over the face of a vertical bank, the provision of a plurality of brush carriages to each aforesaid screw, means to connect only the brush carriage having access to the bank containing the required contact, a power drive to operate the said screw, and a trip mechanism to disengage the screws from the power drive.

12. In a telephone system, the combination of power-driven switch mechanisms consisting of open-ended screws actuating brush carriages, a plurality of contacts, trunks and lines associated with the contacts, means whereby a predetermined electrical condition is associated with each switch member, a trip mechanism adapted to arrest the travel of the brush carriages, a control recorder operated by the action of a calling device, and means whereby a particular electrical condition is set up on such control recorder, a balancing arrangement to operate the trip mechanism of a switch mechanism, which has associated therewith the same electrical condition as recorded on the control recorder on the brush fingers of the said switch encountering a set of contacts connected to the said control recorder.

13. In a telephone system, the combination of a number of power-driven switch mechanisms, a number of contacts, a plurality of lines and trunks, associated with the said contacts, calling mechanisms, control recorders, operated by the said calling mechanisms, means whereby electrical conditions are set up by the control recorder, a number of control repeaters to which are transferred the electrical conditions of the remaining un-selected digits established on the control recorder, such digits being selected by the control repeater, a balancing arrangement successively balancing the electrical conditions established on the control repeater with those established on the wanted trunks and lines, and a trip mechanism to arrest the travel of the seeking or sought for switch mechanisms.

14. In a telephone system, the combination of power-driven switch mechanisms consisting of open-ended screws, actuating brush carriages, a plurality of contacts, trunks and lines associated with the said contacts, calling mechanisms, control recorders, operated by the said call mechanisms, primary control repeaters actuated by the control recorders, subsidiary control repeaters actuated by the aforementioned primary control repeaters, means whereby electrical conditions are associated with the said control recorders, control repeaters and trunk and line contacts, a balancing arrangement successively balancing the electrical conditions established on the control recorder, primary control repeater, secondary control repeater and line and trunk contacts, and trip mechanisms to arrest the travel of the seeking or sought for switch mechanisms.

15. In a telephone system, the combination of power driven switch mechanisms, a plurality of contacts, trunks and lines associated with the said contacts, a closed type of connecting trunk, common to several groups switching means to select only the section of the said common trunk necessary to establish the required connection, allowing the remaining sections to be used for other connections.

16. In a telephone system, the combination of power-driven switch mechanisms, a plurality of contacts, trunks and lines associated with the said contacts, means whereby, in a common or closed type of trunk, entry thereto may be made at several points, and the selection made either to the right or left of the said entry point.

17. In a telephone system, the combination of power-driven switch mechanisms, a plurality of contacts, trunks and lines associated with the said contacts, a closed type of connecting trunk, common to several groups, means whereby selection may be made either to the right or left of the point of entry, and means whereby one or more sections in the given direction may be utilized to establish the connection.

18. In a telephone system, the combination of power-driven switch members, a plurality of contacts, trunks and lines associated with the said contacts, call sending mechanisms, control recorders, control repeaters, means whereby electrical conditions are associated with the said trunks and lines, balancing means to operate trip mechanisms to arrest the travel of the sought for or seeking switch mechanisms and means whereby the control repeater will apply ringing current to the wanted line.

19. In a telephone system, the combination of power-driven switch members, a plurality of contacts, trunks and lines associated with the said contacts, call sending mechanisms, control recorders, control repeaters, means whereby electrical conditions are associated with the said trunks and lines, balancing means to operate trip mechanisms to arrest the travel of the sought for or seeking switch mechanisms, and means whereby the control recorder will impose a busy tone on the calling lines, should the called line be engaged.

20. In a telephone system, the combination of power-driven switch members, a plurality of contacts, trunks and lines associated with the said contacts, call sending mechanisms, control recorders, control repeaters, means whereby electrical conditions are associated with the said trunks, and lines, balancing means to operate trip mechanisms to arrest the travel of the sought for or seeking switch mechanisms, and means whereby the control recorder will at the expiration of a given time, and if the required connection be not accomplished, disconnect the apparatus so far held.

21. In a telephone system, a combination of power-driven switch members, a plurality of contacts, trunks and lines associated with the said contacts, call sending mechanisms, control recorders, control repeaters, means whereby electrical conditions are associated with the said trunks and lines, balancing means to operate trip mechanisms to arrest the travel of the sought for or seeking switch mechanisms, and means adapted on the established connection exceeding a predetermined period, to automatically disconnect the connection, giving a warning tone before so doing.

Signed at London, England, this 31st day of March, 1920.

THOMAS LENAGHAN.